United States Patent
Sakai

(10) Patent No.: US 8,308,255 B2
(45) Date of Patent: Nov. 13, 2012

(54) IMAGE FORMING APPARATUS

(75) Inventor: Hiroaki Sakai, Chino (JP)

(73) Assignee: Seiko Epson Corporation, Tokyo (JP)

( * ) Notice: Subject to any disclaimer, the term of this patent is extended or adjusted under 35 U.S.C. 154(b) by 600 days.

(21) Appl. No.: 12/615,998

(22) Filed: Nov. 10, 2009

(65) Prior Publication Data
US 2010/0156972 A1    Jun. 24, 2010

(30) Foreign Application Priority Data

Dec. 18, 2008 (JP) ................ 2008-322196

(51) Int. Cl.
*B41J 29/38* (2006.01)
*B41J 2/155* (2006.01)
(52) U.S. Cl. ............... 347/9; 347/11; 347/13; 347/42
(58) Field of Classification Search .............. 347/9
See application file for complete search history.

(56) References Cited

U.S. PATENT DOCUMENTS

| 7,198,418 | B2 | 4/2007 | Ishizaka et al. | 400/62 |
| 7,311,379 | B2 | 12/2007 | Mitsuzawa | 347/40 |
| 2004/0046830 | A1* | 3/2004 | Mitsuzawa | 347/40 |
| 2005/0129443 | A1 | 6/2005 | Ishizaka et al. | 400/62 |

FOREIGN PATENT DOCUMENTS

| JP | 06-314254 | 11/1994 |
| JP | 2004-025551 | 1/2004 |
| JP | 2005-193651 | 7/2005 |

* cited by examiner

*Primary Examiner* — Uyen Chau N Le
*Assistant Examiner* — Kajli Prince
(74) *Attorney, Agent, or Firm* — DLA Piper LLP (US)

(57) ABSTRACT

An image forming apparatus includes a plurality of controllers that controls nozzle groups for forming an image on an image forming medium based on image data; a plurality of distribution processing units that are connected to a portion of the controllers to transmit to the controllers image data for controlling the nozzle groups allocated to the controllers; and a transmitting processing unit that transmits the image data to the distribution processing unit. Upper and lower level distribution processing units from the first distribution processing unit at the uppermost level to the second distribution processing unit at the lowermost level are communicatably connected to each other. The first distribution processing unit is communicatably connected to the transmitting processing unit.

6 Claims, 20 Drawing Sheets

FIG. 2A
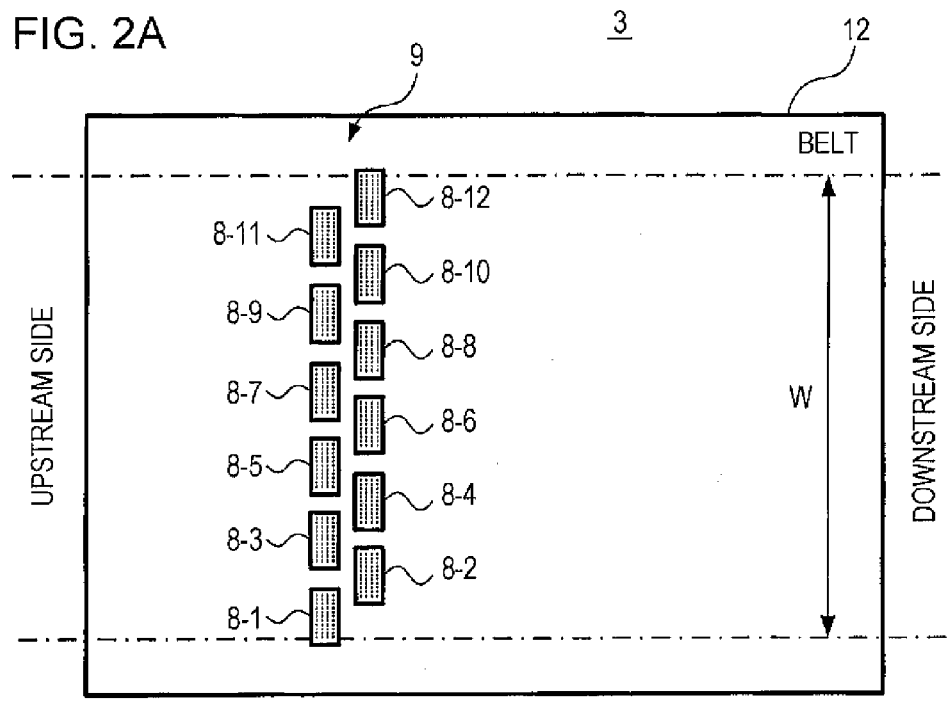
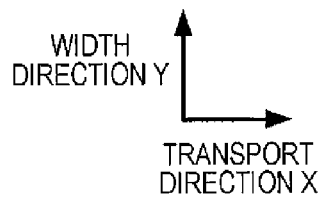
FIG. 2B
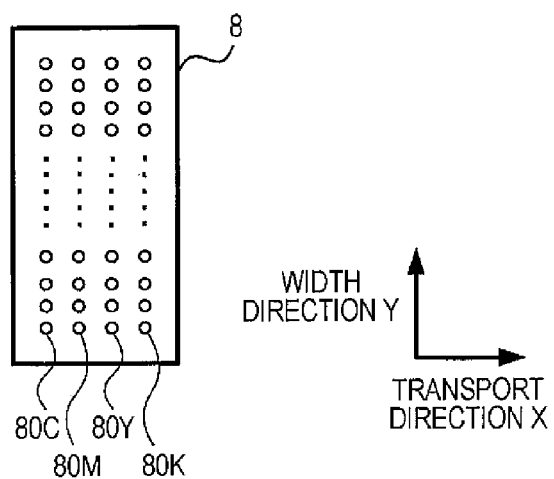

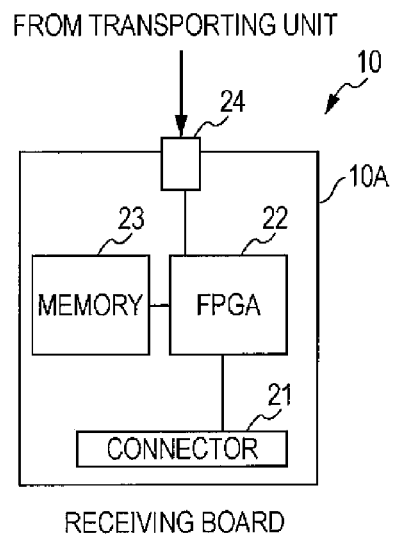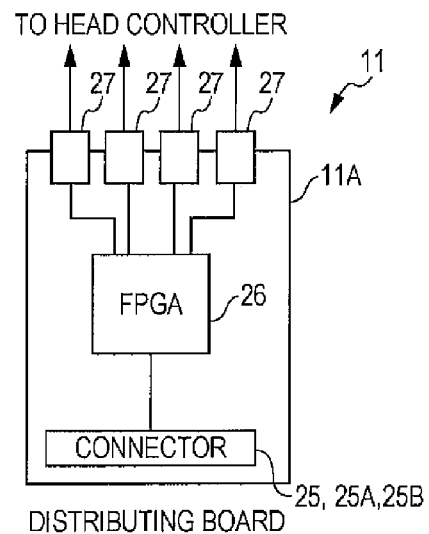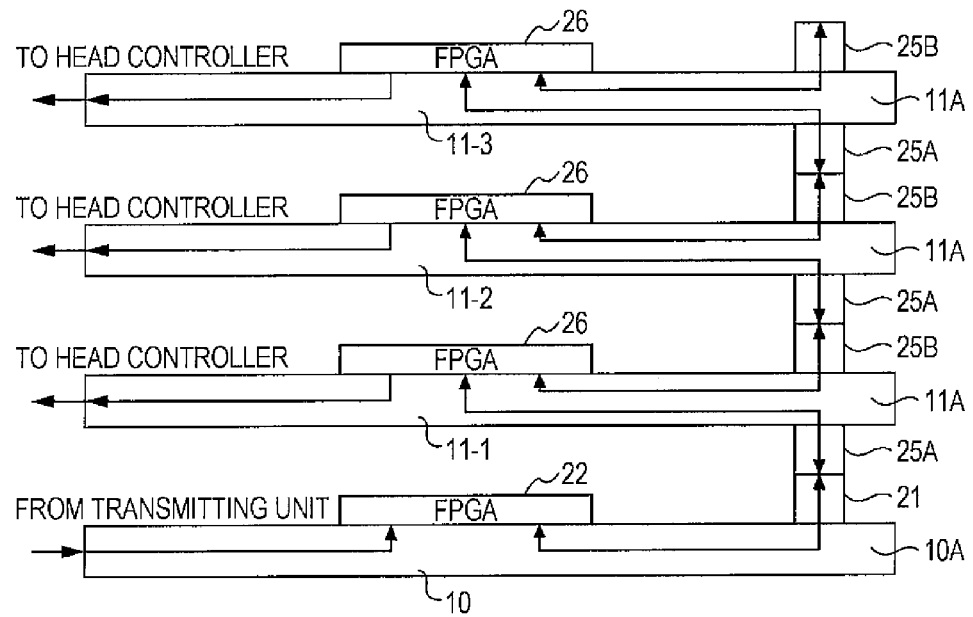

FIG. 19

| ADDRESS | DISTRIBUTING UNIT ID | SETTING INFORMATION |
|---|---|---|
| 0X00000000 | 0 | NUMBER OF COLORS OF IMAGE |
| 0X00000004 | 0 | IMAGE SIZE IN TRANSPORT DIRECTION |
| 0X00000008 | 0 | IMAGE SIZE IN WIDTH DIRECTION |
| 0X0000000C | 0 | TO-BE-ACQUIRED COLOR |
| 0X00000010 | 0 | TO-BE-ACQUIRED LINE |
| 0X000000A0 | 0 | CONNECTION STATE OF HEAD CONTROLLER |
| . | . | . |
| . | . | . |
| 0X00000100 | 1 | NUMBER OF COLORS OF IMAGE |
| 0X00000104 | 1 | IMAGE SIZE IN TRANSPORT DIRECTION |
| 0X00000108 | 1 | IMAGE SIZE IN WIDTH DIRECTION |
| 0X0000010C | 1 | TO-BE-ACQUIRED COLOR |
| 0X00000110 | 1 | TO-BE-ACQUIRED LINE |
| 0X000001A0 | 1 | CONNECTION STATE OF HEAD CONTROLLER |
| . | . | . |
| . | . | . |

IMAGE FORMING APPARATUS

BACKGROUND

1. Technical Field

The present invention relates to an image forming apparatus that controls a nozzle group, which is used to form an image on an image forming medium, based on image data.

2. Related Art

In the related art, there is disclosed a line ink jet printer that includes head columns capable of ejecting ink over the entire one row of a sheet in the width direction thereof so that the printing in the width direction of the sheet can be performed without movement of the head. In such a line ink jet printer, a plurality of the head columns are aligned in the transport direction of the sheet so as to implement, for example, an image with high quality or an image with multiple colors.

For example, in such a line ink jet printer, each head column may include a plurality of heads, and a plurality of head controllers for controlling heads (nozzle groups formed in each head) may be provided. In the line ink jet printer, a transmitting processing unit transmits the image data, which are received from an external apparatus, to a plurality of distribution processing units connected to the head controllers, and each of the distribution processing units transmits the image data for controlling the heads to the head controllers.

Herein, since the data transmission rate from the distribution processing unit to the head controller is slower than the data transmission rate from the transmitting processing unit to the distribution processing unit, the distribution processing unit may include a buffer that temporarily stores the data that are to be transmitted to the head controller.

For example, there is disclosed a technique in which a buffer memory is prepared between a transmitting side and a receiving side, and the buffer memory is controlled to be used in accordance to the processing rate of the receiving side and the transmission rate of the transmitting side, so that the transmission time can be prevented from increasing and so that the memory can be effectively used (for example, refer to JP-A-6-314254).

In the line ink jet printer, the image data are transmitted to a plurality of the head controllers. However, in the case where necessary data are transmitted to the head controllers, the image data to the head controller as the transmitting destination may not be received by the distribution processing unit or the head controllers.

Therefore, before the image data are transmitted, a distribution processing unit that relays the data to the head controller as the transmitting destination needs to check whether or not the image data can be received.

In this manner, at the time of transmitting the image data, if the check as to whether or not the image data can be received starts, a time is taken until the check as to whether or not the image data can be received is completed. Accordingly, there is a problem in that communication efficiency deteriorates.

SUMMARY

An advantage of some aspects of the invention is to provide an image forming apparatus capable of efficiently transmitting image data to a controller.

According to an aspect of the invention, there is provided an image forming apparatus including: a plurality of controllers that controls nozzle groups for forming an image on an image forming medium based on image data a plurality of distribution processing units that are connected to a portion of the controllers to transmit to the controllers image data for controlling the nozzle groups allocated to the controllers; and a transmitting processing unit that is used to transmit the image data to a plurality of the distribution processing units, wherein upper level distribution processing units and lower level distribution processing units from the first distribution processing unit at the uppermost level to the second distribution processing unit at the lowermost level are communicatably connected to each other, and the first distribution processing unit is communicatably connected to the transmitting processing unit, wherein the transmitting processing unit includes: a memory that stores the image data; a next transmitting destination determining unit that determines the next transmitting destination identification information indicating the controller as the next transmitting destination with respect to the controller as the transmitting destination; an image data reading unit that reads from the memory the image data that are to be transmitted to the controller of the transmitting destination; an image data transmitting unit that transmits to the controller of the transmitting destination the read image data; a next transmitting destination identification information transmitting unit that transmits the next transmitting destination identification information to the first distribution processing unit before the transmission of the image data to the controller of the transmitting destination is completed; and a determination-result receiving unit that receives from the first distribution processing unit a result of determination as to whether or not the controller indicated by the next transmitting destination identification information receives the image data, wherein in the case where the image data can be received as the result of determination and in the case where the transmission of the image data to the controller of the next transmitting destination is prepared, the image data transmitting unit transmits the image data to the controller indicated by the next transmitting destination identification information as a new transmitting destination, and wherein the distribution processing unit includes: a next transmitting destination receiving unit that receives the next transmitting destination identification information from the transmitting processing unit or the upper level distribution processing unit; a reception determining unit that determines whether or not the controller can receive the image data in the case where the controller indicated by the received next transmitting destination identification information is the controller allocated to the corresponding distribution processing unit; a lower level determination-result receiving unit that receives the result of determination from the lower level distribution processing unit; a determination-result transmitting unit that transmits to the transmitting processing unit or the upper level distribution processing unit the result of determination that the image data can be received in the case where the image data can be received as the result of self determination or the result of determination from the lower level distribution processing unit, and that transmits to the transmitting processing unit or the upper level distribution processing unit the result of determination that the image data cannot be received in the other cases; an image data receiving unit that receives the image data for the transmitting destination from the transmitting processing unit or the upper level distribution processing unit; and a transmitting unit that transmits the image data to the corresponding controller in the case where the image data are the image data for the controller allocated to the corresponding distribution processing unit.

According to the image forming apparatus, before the transmission of the image data to the controller of the transmitting destination is completed, the next transmitting destination identification information is transmitted to the first distribution processing unit. Since the next transmitting destination identification information is transmitted to each distribution processing unit and since the result of determination as to whether or not the image data can be received is received from the distribution processing unit allocated to the controller indicated by the next transmitting destination identification information, it can be rapidly determined whether or not the next transmitting destination can receive the image data. Therefore, the image data can be rapidly transmitted to the next transmitting destination.

In the image forming apparatus, the next transmitting destination identification information transmitting unit and the image data transmitting unit may transmit to the first distribution processing unit a combination of the image data, the transmitting destination identification information of the controller as the transmitting destination, and the next transmitting destination identification information. According to the image forming apparatus, when the image data are transmitted to the transmitting destination, the next transmitting destination identification information can be transmitted early, so that the result of determination that the next transmitting destination can receive the image data can be rapidly received.

In addition, in the image forming apparatus, the image data transmitting unit may transmit to the transmitting destination the image data in a unit of data including predetermined lines of the data for forming one line of the image by using one nozzle among the image data. According to the image forming apparatus, the data that are to be used by each nozzle can be appropriately transmitted.

In addition, in the image forming apparatus, the data including predetermined lines may be a data amount that requires a transmission time that is longer than an expected arrival time in which the result of determination from the second distribution processing unit is expected to arrive. According to the image forming apparatus, the possibility of receiving the result of determination as to whether or not the next transmitting destination can receive the image data until the image transmission to the transmitting destination is not completed can be increased. Therefore, the possibility of starting the transmission of the image data to the next transmitting destination just after the image data are transmitted to the transmitting destination is increased, so that the processing time can be reduced.

In addition, in the image forming apparatus, the image data reading unit may read from the memory the image data in a minimum unit of the data for forming one line of the image by using one nozzle among the image data. According to the image forming apparatus, since the minimum unit of reading the data from the memory is one line, the data can be rapidly read from the memory.

In addition, in the image forming apparatus, the data transmitting unit may include a temporary storage unit that temporarily stores the image data to the transmitting destination, wherein the image data reading unit reads the image data from the memory and stores the image data in the temporary storage unit in the case where the image data cannot be received as the result of determination, and wherein the data transmitting unit extracts the image data from the temporary storage unit and transmits the image data in the case where the image data can be received as the result of determination. According to the image forming apparatus, in the case where the image data can be received as the result of determination, since the image data can be extracted not from the memory but from the temporary storage unit, a time required for the transmission can be reduced.

BRIEF DESCRIPTION OF THE DRAWINGS

The invention will be described with reference to the accompanying drawings, wherein like numbers reference like elements.

FIGS. 2A and 2B are views for explaining arrangement of heads and configuration of a head according to the first embodiment of the invention.

FIGS. 4A to 4C are views showing a hardware configuration of a distributing unit according to the first embodiment of the invention.

FIG. 19 is a view for explaining distributing unit setting information according to the second embodiment of the invention.

DESCRIPTION OF EXEMPLARY EMBODIMENTS

Hereinafter, exemplary embodiments of the invention will be described with reference to the attached drawings. In addition, the embodiments described hereinafter are not be intended to limit the invention, but the elements described in the embodiments or all the combinations thereof may not be only the requisite elements for implementing the invention.

Firstly, an image forming system including a line ink jet printer (hereinafter, referred to as a printer) as an example of an image forming apparatus according to a first embodiment of the invention is described.

Figure 1:
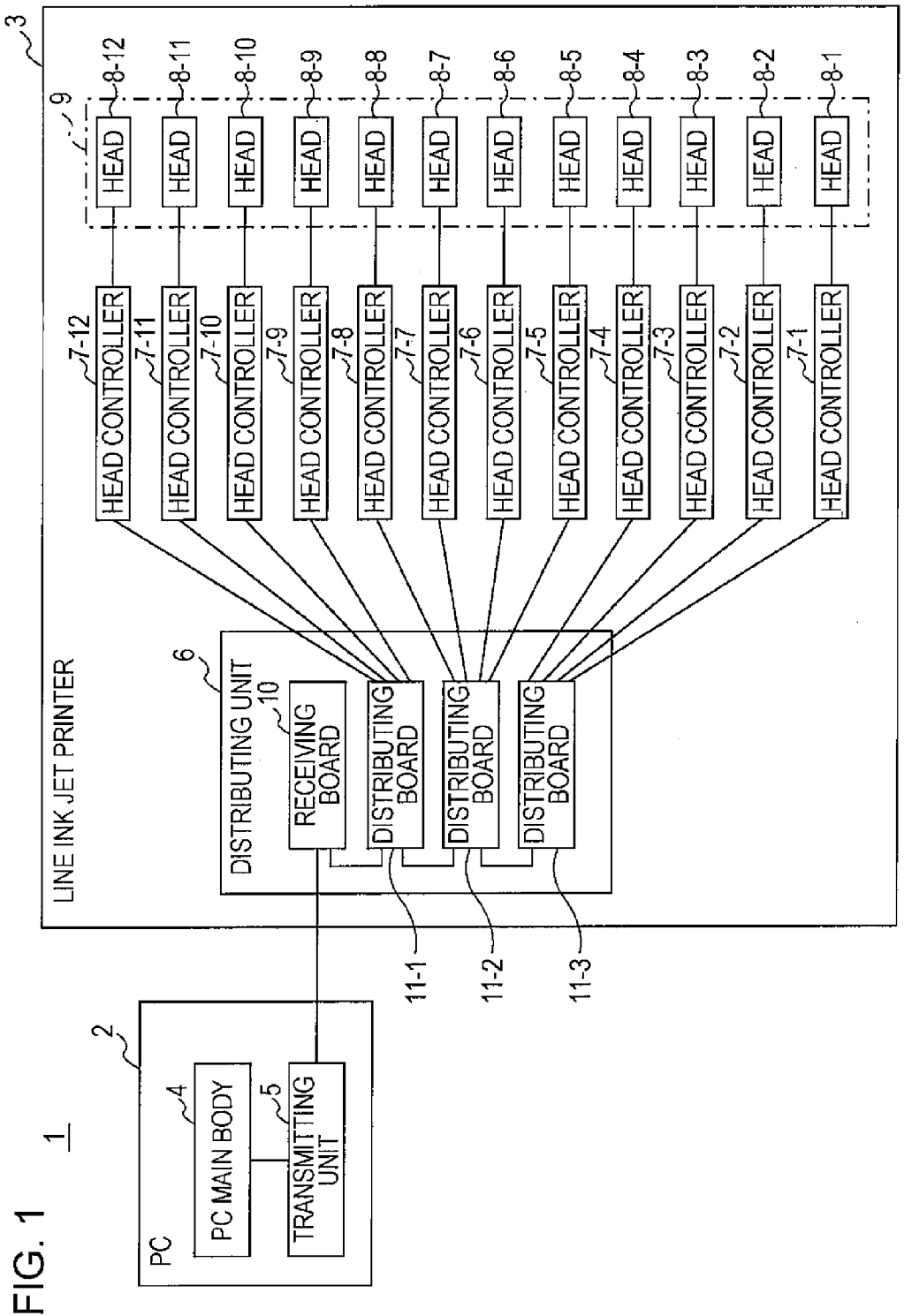
FIG. 1 is a view showing a configuration of an image forming system according to a first embodiment of the invention.

FIG. 1 is a view showing a configuration of an image forming system according to a first embodiment of the invention.

The image forming system 1 includes a PC (Personal Computer) 2 and a printer 3.

The PC 2 includes a PC main body 4 and a transmitting unit 5. The PC main body 4 includes, for example, a CPU (Central Processing Unit), a ROM (Read Only Memory), and a RAM (Random Access Memory). The PC main body 4 executes a process of generating image data that are to be printed by the printer 3 and transferring the image data to the transmitting unit 5. The transmitting unit 5 generates image data for the printers 3 based on the image data received from the PC main body 4. The transmitting unit 5 generates, for example, image data of each color (for example, C (cyan), M (magenta), Y (yellow), K (black)) in one image formed by the printer 3. In addition, the transmitting unit 5 transmits the image data for each color to the printer 3.

In addition, the transmitting unit 5 transmits distributing unit setting information that is used to set up a distributing unit 6 of the printer 3. In the embodiment, the distributing unit setting information includes the number of colors in the printing image, a transport direction image size, a width direction image size, and head controller connection state information. The head controller connection state information is information indicating a connection state (existence or non-existence of connection) of each head controller 7 to each slot 27 of a distributing board 11 of the distributing unit 6. For example, as data indicating the connection state to each slot 27, one bit is allocated to the head controller connection state information. In the case where the head controller 7 is connected to the corresponding slot 27, the bit is set to "1"; in the case where the head controller 7 is not connected thereto, the bit is set to "0".

The printer 3 includes the distributing unit 6, a plurality (for example, 12) of the head controllers 7-1 to 7-12 (in the case where the head controllers are not specified, these elements may be denoted by head controllers 7) and a plurality of (for example, 12) heads 8-1 to 8-12 (in the case where the heads are not specified, these elements may be denoted by heads 8). In the embodiment, one head controller 7 is connected to one head 8 to control the corresponding one head 8. In addition, one head controller 7 may be connected to a plurality of heads 8 to control a plurality of the heads 8. The distributing unit 6 includes a receiving board (transmitting processing unit) 10 and a plurality of distributing boards (distribution processing unit) 11-1 to 11-3 (in the case where the distributing boards are not specified, these elements may be denoted by distributing boards 11). In the embodiment, a plurality (for example, 4) of the head controller 7 are connected to each of the distributing boards 11.

FIGS. 2A and 2B are views for explaining arrangement of heads and configuration of a head according to the first embodiment of the invention. FIG. 2A is a top plan view showing the arrangement of the heads of the printer 3; and FIG. 2B is a top plan view showing the head. In addition, in FIGS. 2A and 2B, a layout of nozzles perspectively seen from the top surfaces thereof is shown.

The printer 3 is provided with a belt 12 that transfers a sheet (image forming medium) such as a paper, an OHP sheet, or a cloth fed by a feed tray (not shown). The belt 12 is driven by a motor (not shown). When printing (image forming) is to be performed on the sheet, the belt 12 transfers the sheet in a transport direction X, that is, in a direction from the upstream side (left side of FIG. 2A) to the downstream side (right side of FIG. 2A) at a substantially constant speed.

The printer 3 is configured to perform printing on sheets having a plurality of sizes. In the embodiment, the printer 3 can print sheets having various sizes that are up to a width W (maximum printable width) as shown FIG. 2A. The printer 3 according to the embodiment is configured so that a substantial center of the width direction Y of the sheet is transferred along with a substantial center of the width direction Y of the belt 12 irrespective of the size of the sheet.

The printer 3 is provided with a plurality of the heads 8 (8-1 to 8-12). Due to a plurality of the heads 8, ink can be ejected at a predetermined resolution over the entirety of the maximum printable width W in the width direction Y. In addition, a combination of the heads 8 that are configured to print over the entirety of the maximum printable width W is referred to as a head column.

As shown in FIG. 2B, the head 8 is configured so that a plurality of nozzles (nozzle groups: for example, a plurality of nozzles 80C for cyan ink ejection, a plurality of nozzles 80M for magenta ink ejection, a plurality of nozzles 80Y for yellow ink ejection, and a plurality of nozzles 80K for black ink ejection) for ejecting ink as an example of an image forming material are disposed toward the sheet transporting side (depth direction of the figure). In the embodiment, in each of the heads 8, a cyan nozzle column where a plurality (for example, 180) of the cyan ink nozzles 80C are aligned, for example, in the width direction Y, a magenta nozzle column where a plurality of the nozzles 80M are aligned, a yellow nozzle column where a plurality of the nozzle 80Y are aligned, and a black nozzle column where a plurality of the nozzle 80K are aligned are formed to be aligned in the transport direction X. In the heads 8, a piezoelectric vibrator (not shown) that expands and contracts according to an applied driving signal is disposed corresponding to each of the nozzles (80C, 80M, 80Y, and 80K). By controlling the expansion and contraction of the piezoelectric vibrator, ejection of ink from each nozzle can be controlled.

As shown in FIG. 2A, the head column 9 is configured so that a plurality of the heads 8 are arranged in a zigzag shape (alternating shape) in the width direction Y. A plurality of the heads 8 (8-1, 8-3, 8-5, 8-7, 8-9, and 8-11) disposed at the upstream side of the head column 9 are aligned at predetermined interval in the width direction Y. A plurality of the heads 8 (8-2, 8-4, 8-6, 8-8, 8-10, and 8-12) disposed at the downstream side of the head column 9 are aligned so as to compensate for the printing of the portions (for example, the gaps between the heads 8) that cannot be printed by the upstream-side heads 8 in the maximum printable width. Since a plurality of the heads 8 are arranged in this manner, ink can be ejected at a predetermined resolution over the entirety of the maximum printable width W in the width direction Y.

Figure 3A:
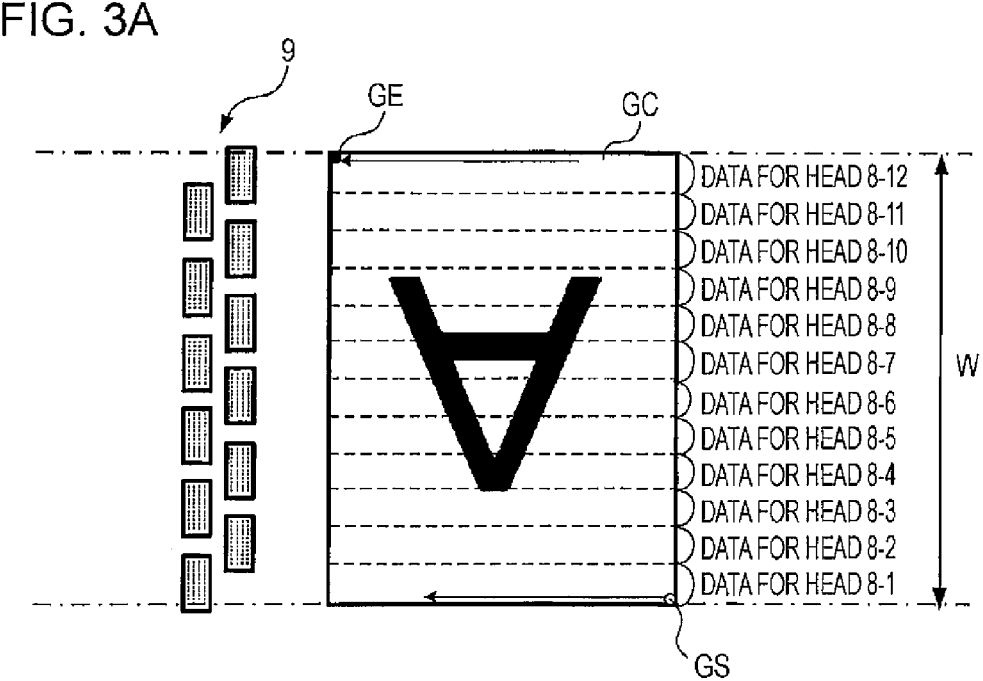
FIGS. 3A and 3B are views for explaining image data according to the first embodiment of the invention and image data used to control each head.
Figure 3B:
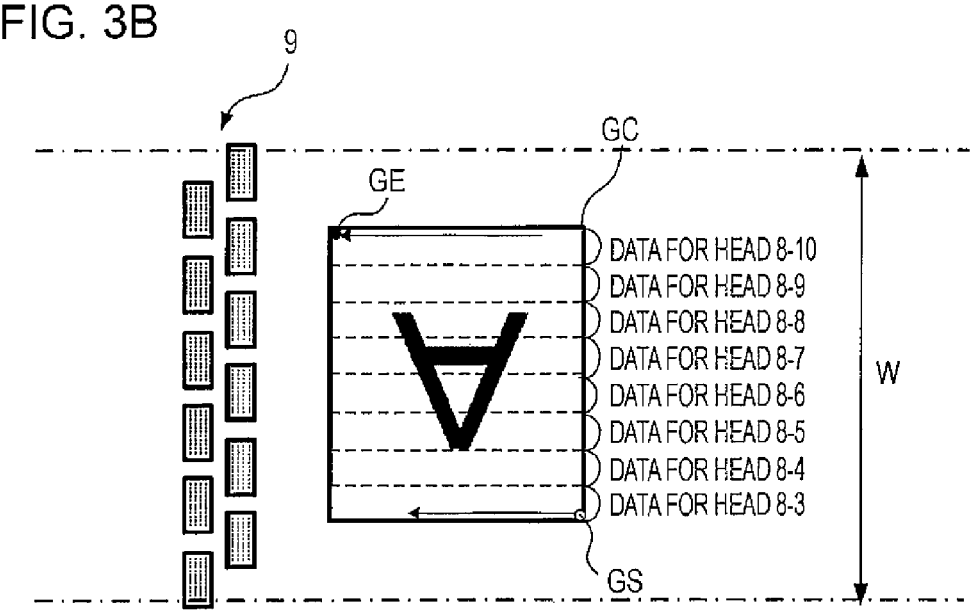

FIGS. 3A and 3B are views for explaining image data according to the first embodiment of the invention and image data used to control each head. FIG. 3A is a view for explaining the image data of an image having maximum printable width W, and FIG. 3B is a view for explaining the image data of an image having a width smaller than the maximum printable width W.

As shown in FIG. 3A, in the case where a printing image is the image having maximum printable width W, the transmitting unit 5 reads from image data GC for each color of a to-be-formed image the pixel data corresponding to one line of pixels in the order of the direction opposite to the transport direction X from the pixel data corresponding to the firstly-printed pixel GS that is located at the corner of the image. Next, similarly, the transmitting unit 5 reads the pixel data corresponding to the line next to (in the figure, the upper line of) the pixel GS. By repeating the process of reading the pixel data corresponding to each of the lines, the transmitting unit 5 reads all the pixel data up to the pixel data corresponding to the pixel GE and transmits the read image data to the printer 3. The image data are used to control the heads 8 that are designated to the positions of the pixels in the width direction Y. In the embodiment, the image data are denoted by data for the head 8-1 to data for the head 8-12 according to the reading order.

In addition, as shown in FIG. 3B, in the case where the printing image is the image having a width smaller than the maximum printable width W, the transmitting unit 5 reads from the image data GC for each color of the to-be-formed image the pixel data corresponding to one line of the pixels in the order of the direction opposite to the transport direction X from the pixel data corresponding to the firstly-printed pixel GS that is located at the corner of the image. Next, similarly, the transmitting unit 5 reads the pixel data corresponding to the line next to (in the figure, the upper line of) the pixel GS. By repeating the process of reading the pixel data corresponding to each of the lines, the transmitting unit 5 reads all the pixel data up to the pixel data corresponding to the pixel GE and transmits the read image data to the printer 3. The image data are used to control the heads 8 that are designated to the positions of the pixels in the width direction Y. In the embodiment, the image data are denoted by data for the head 8-3 to data for the head 8-10 according to the reading order.

FIGS. 4A to 4C are views showing a hardware configuration of a distributing unit according to the first embodiment of the invention. FIG. 4A is a view showing a configuration of the receiving board 10; FIG. 4B is a view showing a configuration of the distributing board 11; and FIG. 4C is a view showing a connection state of connection between the receiving board 10 and the distributing board 11.

In the receiving board 10, as shown in FIG. 4A, a male connector 21 that is to be communicatably connected to the uppermost distributing board 11-1 among a plurality of the distributing board 11, an FPGA (Field Programmable Gate Array) 22 that executes various processes, a memory 23, and a slot 24 that is to be connected to a communication line for the transmitting unit 5 are disposed on a board 10A. Herein, the upper position of the distributing board 11 denotes that the distributing board 11 is positioned at the side of the receiving board 10 in terms of communication.

In the distributing board 11, as shown in FIG. 4B, a female connector 25A that is to be communicatably connected to the upper component (receiving board 10 or distributing board 11), a male connector 25B that is to be communicatably connected to the lower distributing board 11, an FPGA 26 that executes various processes, and a plurality (for example, 4) of slots 27 that are to be connected to communication lines for a plurality of the head controllers 7 are disposed on a board 11A. In the embodiment, one head controller 7 can be connected to each of the slot 27. As shown in FIG. 4C, the connector 25A and the connector 25B are disposed at symmetric positions with respect to the board 11A. Since the connector 25A and the connector 25B are disposed in this manner, the distributing boards 11 can be formed in the same shape. Therefore, production cost of each distributing board 11 can be reduced.

As shown in FIG. 4C, in the distributing unit 6, the male connector 21 of the receiving board 10 is connected to the female connector 25A of the uppermost level distributing board 11-1; the male connector 25B of the distributing board 11-1 is connected to the female connector 25A of the distributing board 11-2; and the male connector 25B of the distributing board 11-2 is connected to the female connector 25A of the lowermost level distributing board 11-3 in the embodiment.

In the embodiment, as shown in 4C, the transmitting unit 5 and the FPGA 22 of the receiving board 10 are configured to be communicated to each other. In addition, the FPGA 22 of the receiving board 10 and the FPGA 26 of the uppermost level distributing board 11-1 are configured to be communicated to each other through the connector 21 and the connector 25A. In addition, the FPGA 26 of the distributing board 11-1 and the FPGA 26 of the lower level distributing board 11-2 are configured to be communicated to each other through the connector 25B and the connector 25A. In addition, the FPGA 26 of the distributing board 11-2 and the FPGA 26 of the lower level distributing board 11-3 are configured to be communicated to each other through the connector 25B and the connector 25A.

Figure 5:
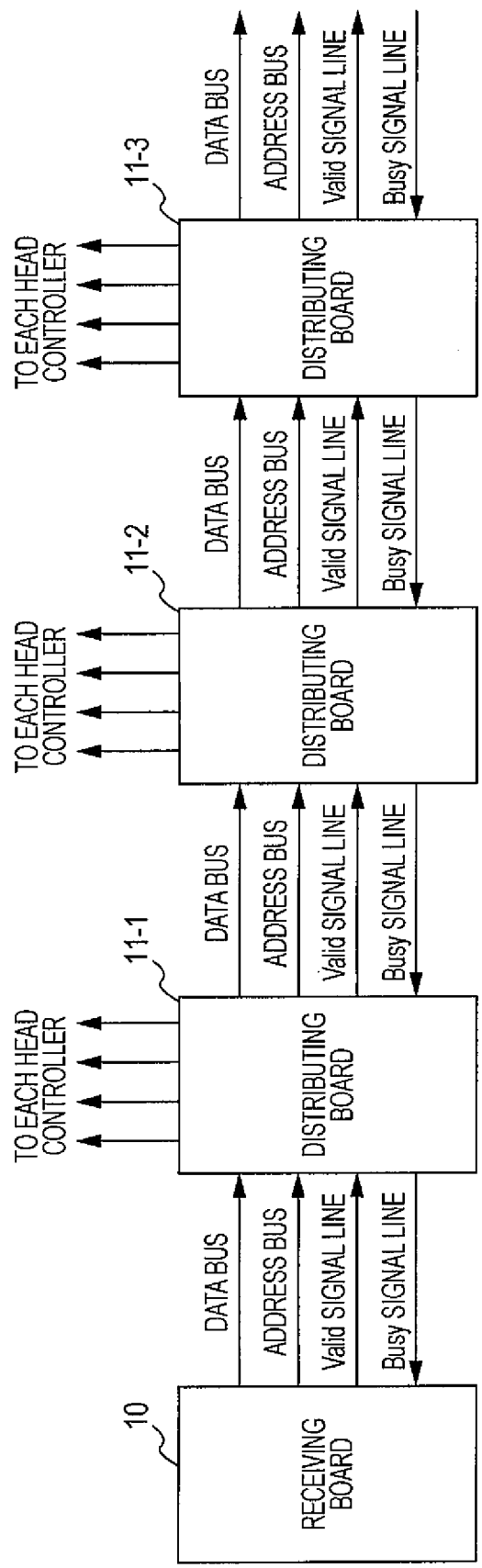
FIG. 5 is a view for explaining signal lines of the distributing unit according to the first embodiment of the invention.

FIG. 5 is a view for explaining signal lines of the distributing unit according to the first embodiment of the invention.

In the distributing unit 6, the receiving board 10 and a plurality of the distributing boards 11-1 to 11-3 are connected in cascade. In other words, between the receiving board 10 and the distributing board 11-1, a data bus, an address bus, a Valid signal line that is used to transmit the later-described Valid signal, and a Busy signal line that is used to transmit the later-described Busy signal are connected. In addition, between the distributing board 11-1 and the distributing board 11-2, a data bus, an address bus, a Valid signal line, and a Busy signal line are connected. In addition, between the distributing board 11-2 and the distributing board 11-3, a data bus, an address bus, a Valid signal line, and a Busy signal line are connected.

Figure 6:
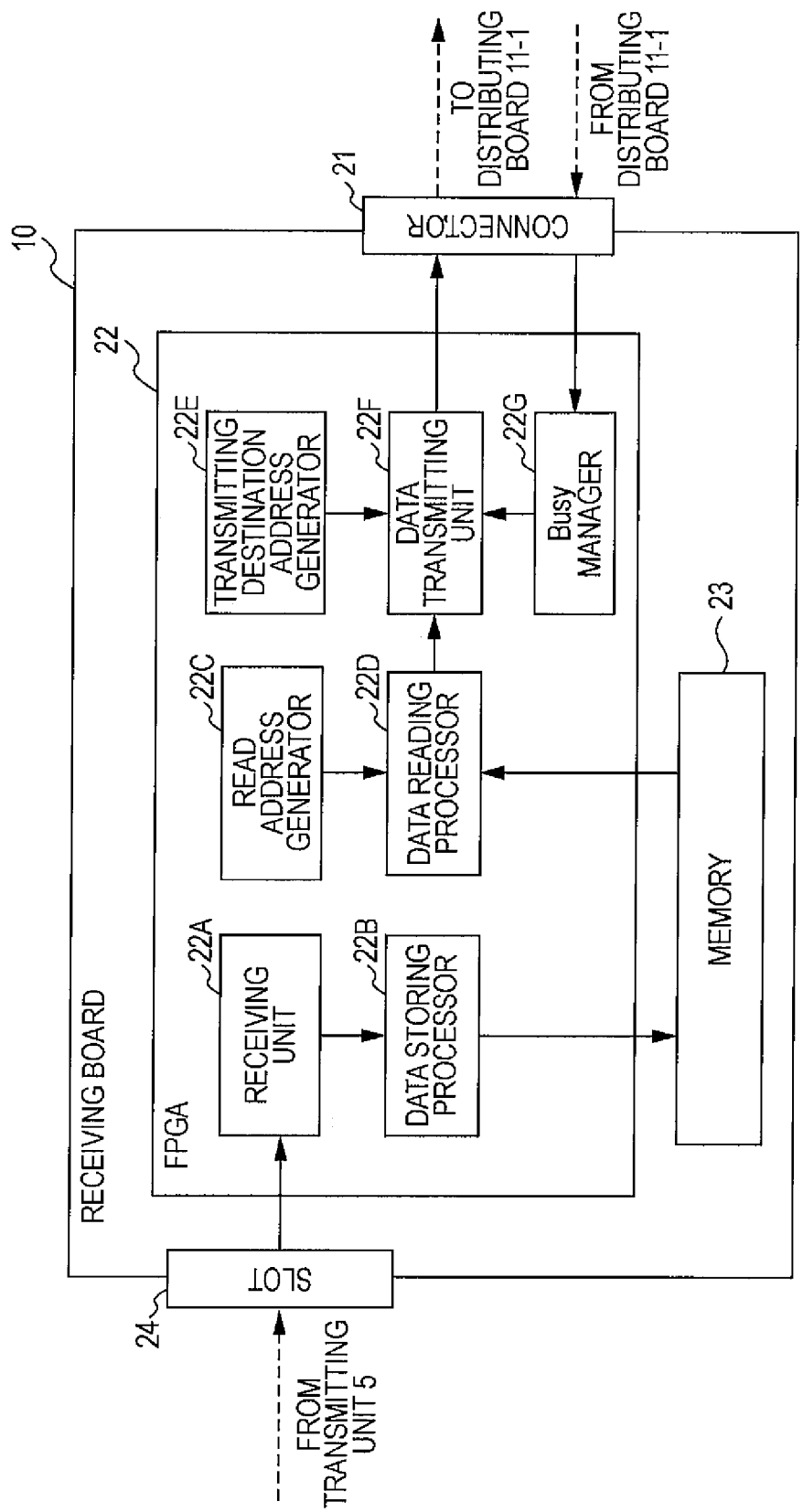
FIG. 6 is a view showing a functional configuration of a receiving board according to the first embodiment of the invention.

FIG. 6 is a view showing a functional configuration of a receiving board according to the first embodiment of the invention.

The FPGA 22 of the receiving board 10 is provided with a receiving unit 22A, a data storing processor 22B, a read address generator 22C, a data reading processor 22D that is an example of an image data reading unit, a transmitting destination address generator 22E that is an example of a transmitting destination determining unit, a data transmitting unit 22F that is an example of an image data transmitting unit and a next transmitting destination identification information transmitting unit, and a Busy manager 22G that is an example of a determination-result receiving unit.

The receiving unit 22A receives the image data that are received from the transmitting unit 5 and sequentially transfers the received image data to the data storing processor 22B. The data storing processor 22B stores the image data that are received from the receiving unit 22A in the memory 23. In the embodiment, the data storing processor 22B continuously stores the image data that are received from the receiving unit 22A.

Figure 7:
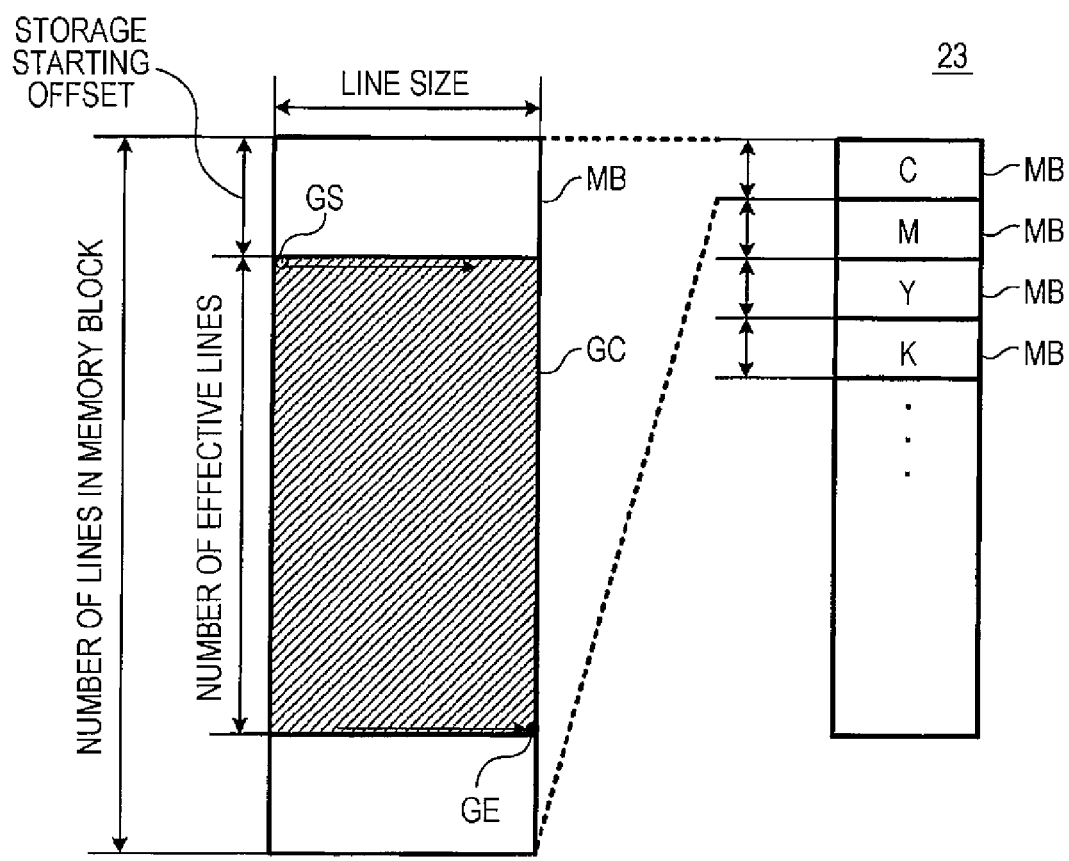
FIG. 7 is a view for explaining areas of a memory according to the first embodiment of the invention.

FIG. 7 is a view for explaining areas of a memory according to the first embodiment of the invention.

As shown in FIG. 7, the memory space of the memory 23 is partitioned into a plurality of memory blocks MB, and the data storing processor 22B stores image data of one color of one page image in one memory block MB. For example, in the case where the printing image data include image data of four colors (CMYK), the data storing processor 22B stores each of the image data of cyan of the one page, the image data of magenta of the one page, the image data of yellow of the one page, and the image data of black of the one page in the corresponding one of the memory blocks MB. In addition, if there is an empty space in the memory space of the memory 23, the image data of other pages may also be stored.

In the memory block MB, the number of lines that can store pixel data constituting the image data is the total number of nozzles allocated to perform one color printing in the maximum printable width W, and the size of each line is the size that can store the pixel data corresponding to the size of the line (the number of pixels in the transport direction constituting an image) of the transmitted image data, so that the one-color image data of the image in the maximum printable width W is stored. In addition, the information such as the size of line of the transmitted image data and the number of lines in the width direction is transmitted from the transmitting unit 5 before the image data are transmitted.

For example, in the case where the width of the image data is smaller than the maximum printable width W as shown in FIG. 3B, the data storing processor 22B empties an area (storage starting offset), which stores data for nozzles of not ejecting any ink at the time of printing, and stores the image data GC therein as shown in FIG. 7. In the image data GC, the pixel data corresponding to the pixel GS located at the corner of the image that is firstly printed are stored in the upper left portion of the area, and the pixel data corresponding to the pixel GE are stored in the lower right portion of the area. The total number of lines, in which the image data GC are stored, is the number of effective lines of the image.

Figure 8A:
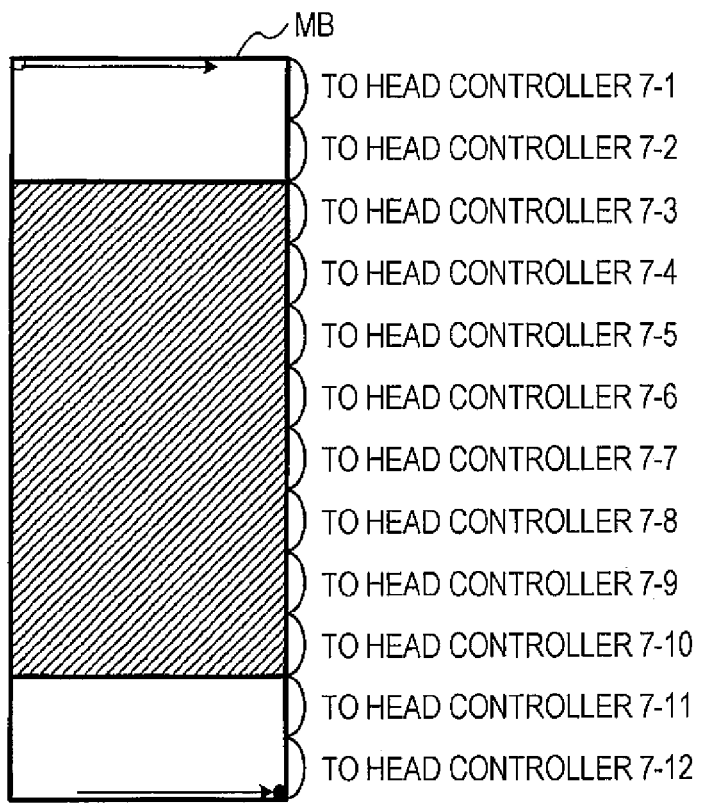
FIGS. 8A and 8B are views for explaining a state of a memory block and image data transmission according to the first embodiment of the invention.
Figure 8B:
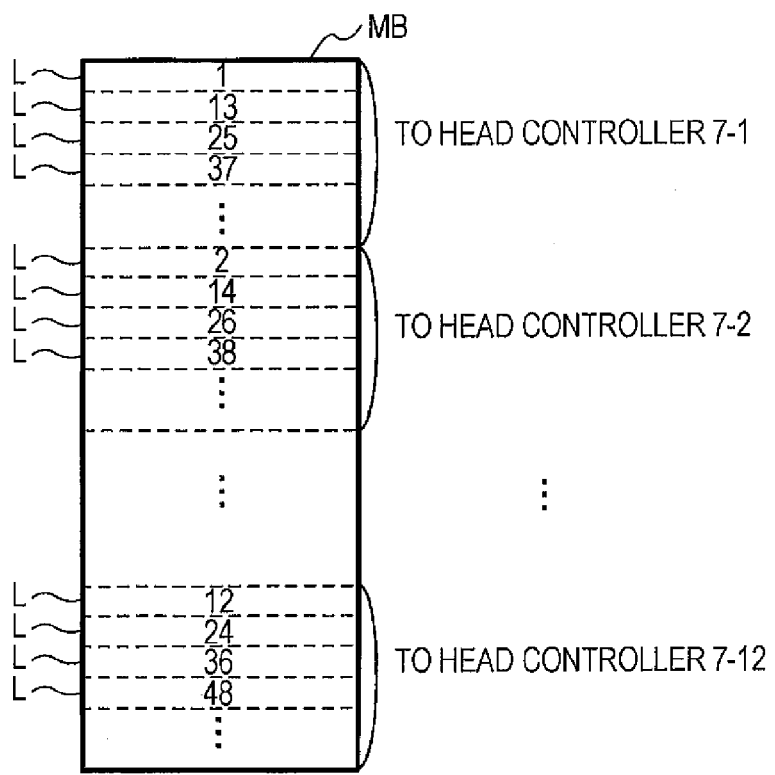

FIGS. 8A and 8B are views for explaining a state of a memory block and image data transmission according to the first embodiment of the invention. FIG. 8A shows a relation of correspondence between the image data that are stored in the memory block and the head controllers to which the data are to be transmitted, and FIG. 8B shows the order of transmission of the lines of the image data.

In the memory block MB in which the image data are stored, as shown in FIG. 8A, in the order from the uppermost area, the image data (image data for the head 8-1) that are to be transmitted to the head controller 7-1 are stored; the image data (image data for the head 8-2) that are to be transmitted to the head controller 7-2 are stored; the image data (image data for the head 8-3) that are to be transmitted to the head controller 7-3 are stored; the image data (image data for the head 8-4) that are to be transmitted to the head controller 7-4 are stored; and after that, the image data from the image data (image data for the head 8-5) that are to be transmitted to the head controller 7-5 to the image data (image data for the head 8-12) that are to be transmitted to the head controller 7-12 are stored. In addition, in the case where the width of the image data is smaller than the maximum printable width W, as shown in FIG. 8A, the uppermost area and the lowermost area are set to NULL values indicating that no ink is ejected, which are stored in the memory block MB in advance.

The read address generator 22C generates an address of the memory 23, from which the data are to be read, based on predetermined information and notifies the address to the data reading processor 22D. In addition, even in the case where real image data are stored in a portion of the memory block MB, the address is generated so that all data in the memory block MB can be read.

Herein, the rate at which the distributing board 11 transmits the image data to the head controller 7 is slower than the rate at which the image data are transmitted from the transmitting unit 5 to the receiving board 10 to be stored in the memory 23 and the rate at which the image data are read from the memory 23. Therefore, if the image data that are to be transmitted to the same head controller 7 are consecutively transmitted, a long time is taken by the distributing board 11 to finish transmitting the image data to all the head controllers 7 due to the influence of the rate of transmission to the same head controller 7.

Herein, in the embodiment, in order to transmit the image data to different head controllers 7 every predetermined N (integer of 1 or more) lines, the read address generator 22C generates the addresses of the different head controllers 7, in which the image data are to be stored, every N lines.

For example, in the case where the image data are designed to be transmitted to different head controllers 7 line by line, the addresses are sequentially generated as shown in FIG. 8B. In other words, the read address generator 22C generates the address indicating the image data L of the line 1 as the data that are to be transmitted to the head controller 7-1. Next, the read address generator 22C generates the address indicating the image data L of the line 2 as the data that are to be transmitted to the head controller 7-2. Similarly, the read address generator 22C generates the addresses indicating the data that are to be transmitted to the head controllers 7-3 to 7-11. After the read address generator 22C generates the address indicating the image data L of the line 12 as the data that are to be transmitted to the head controller 7-12, the read address generator 22C generates the address indicating the data that are to be transmitted to the head controller 7-1 again. Accordingly, the read address generator 22C generates the addresses so that all the data in the memory block MB can be read. In this manner, for example, the addresses of the data that are to be transmitted to the head controller 7-1 are generated at the first, 13-th, 25-th, 37-th, . . . orders; the addresses of the data that are to be transmitted to the head controller 7-2 are generated at the second, 14-th, 26-th, 38-th, orders; and the addresses of the data that are to be transmitted to the head controller 7-12 are generated at the 12-th, 24-th, 36-th, 48-th, . . . orders.

The data reading processor 22D reads from the memory 23 the data corresponding to the address generated by the read address generator 22C. In the embodiment, the data reading processor 22D reads the data of N lines in a unit of the data of one line corresponding to the address and transmits the data to the data transmitting unit 22F.

Next, a process of determining the number N of lines that is a unit of the image data transmitted to each head controller 7 by the read address generator 22C is described.

Figure 9:
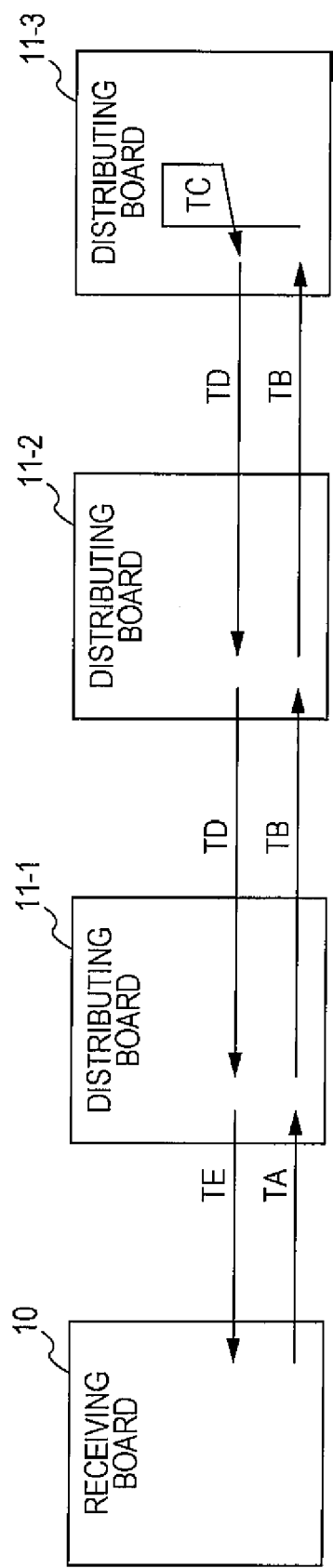
FIG. 9 is a view for explaining a latency of a Busy signal according to the first embodiment of the invention.

FIG. 9 is a view for explaining a latency of a Busy signal according to the first embodiment of the invention.

In the embodiment, as described later, at the same time that the image data are transmitted to one transmitting destination, the receiving of the Busy signal indicating whether or not the image data can be received from the distributing board 11 allocated (connected) to the head controller as the next transmitting destination is performed. Therefore, the image data cannot be transmitted to the next transmitting destination before the Busy signal indicating that the image data can be received from the distributing board 11 allocated to the head controller 7 as the next transmitting destination is received.

In this case, when the transmission of the image data to one transmitting destination is ended, any data are not transmitted, so that the data transmission efficiency deteriorates.

Herein, in the embodiment, in order to transmit the image data in the time until the Busy signal is received from the transmitting destination, the number of lines of the image data that are to be transmitted to one head controller 7 is adjusted.

Herein, as the latency (delay) associated with the Busy signal, there are five types as follows.

There are a time TA until the distributing board 11-1 latches the address data (next transmitting destination address) output from the receiving board 10, a time TB after the address data are latched until the next (lower level) distributing board 11 latches the address data, a time TC after the address data are latched until the Busy determination as to whether or not the distributing board 11 can receive the image data is performed and a response to the preceding (upper level) distributing board 11 is prepared, a time TD after the Busy signal is output until the preceding distributing board 11 prepares to return the address data to the further-preceding distributing board 11, and a time TE until the Busy signal is transmitted from the distributing board 11-1 to the receiving board 10 and the receiving board 10 can determine the Busy signal.

In the embodiment, the adjustment of the number of lines of the image data is determined with reference to a critical path, that is, the path along which the Busy signal returns from the lowermost level distributing board 11-3.

The latency TL until the Busy signal returns from the lowermost level distributing board 11-3 is expressed by the following equation.

TL=TA+TE+TC+(TB+TD)×{(number of connections of distributing board 11)−1}

Herein, the unit of each of the TA, TB, TC, TD, TE, and TL is the number of clocks in the reference clock, and each value thereof is measured in advance and stored in the read address generator 22C.

In the embodiment, the data are configured to be transmitted to each transmitting destination in a unit of the data amount requiring the transmission time that is equal to or longer than the latency TL. For example, if the data of one pixel is one bit, the number N of the lines satisfying TL×{data bus width (bit/1 clock)}≧(one line size)×N is determined as the unit of data that are to be transmitted to each transmitting destination. Therefore, the occurrence of a time in which the data are not transmitted before the Busy signal is received can be reduced.

The transmitting destination address generator 22E generates the address (transmitting destination address: transmitting destination identification information) indicating the head controller 7 as the transmitting destination of the image data read by the data reading processor 22D and outputs the address to the data transmitting unit 22F. In addition, the head controller 7 as the transmitting destination is the head controller 7 to which the data corresponding to the address of the memory 23 by the read address generator 22C are to be transmitted. The head controller 7 can be determined according to the arrangement and configuration of the heads 8 in the printer 3 and the address generation rule of the read address generator 22C. Since the head controller 7 is connected to any slots 27, in the embodiment, the identification information (slot ID) of the slot 27 connected to the head controller 7 and the identification information (distributing board ID) of the distributing board 11 having the slot 27 are used as the address of the head controller 7. In addition, in the embodiment, the connected slot 27 of the head controller 7, to which the image data are to be transmitted, is specified by referring to the connection information of the head controller, so that the corresponding transmitting destination address can be generated. Therefore, there is no problem even in the case where the distributing board 11 has the slot 27 to which the head controller 7 is not connected. For example, an auxiliary slot 27, to which the head controller 7 is not connected, may be provided to any distributing board 11. In the case where any one of slots 27 is out of order, the connection of the head controller 7 is performed by using the auxiliary slot 27, and after that, the image data can be appropriately transmitted to the head controller 7 by designating the address of the corresponding slot 27. In addition, a new distributing board 11 is connected to a lower level of the distributing board 11-3, so that the head controller 7 can be connected by using the slot 27 of the newly added distributing board 11. For example, in this case, the address of the slot 27 connected to the head controller 7 is designated by acquiring the connection information corresponding to the connection state, the image data can be appropriately transmitted to a desired head controller 7.

In addition, the transmitting destination address generator 22E generates the address (next transmitting destination address: next transmitting destination identification information) of the head controller 7 that is the next transmitting destination and outputs the address to the data transmitting unit 22F.

In the embodiment, the transmitting destination address is managed as follows.

Figure 10A:
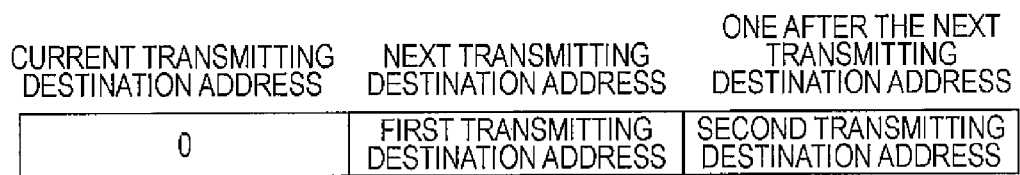
FIGS. 10A to 10C are views for explaining transmitting destination address management according to the first embodiment of the invention.
Figure 10B:
Figure 10C:

FIGS. 10A to 10C are views for explaining transmitting destination address management according to the first embodiment of the invention.

The transmitting destination address generator 22E includes a shift register having three registers in the inner portion thereof. A left side of the shift register stores the current transmitting destination address; a central register stores the next transmitting destination address; and a right side register stores the one after the next transmitting destination address. The shift register is configured to move (shift) the data of each register to the left side register thereof.

As shown in FIG. 10A, at the time of starting the transmission of the image data, the transmitting destination address generator 22E generates the first transmitting destination address, to which the image data are to be transmitted, and stores the first transmitting destination address in the central register. In addition, the transmitting destination address generator 22E generates the second transmitting destination address, to which the image data are to be transmitted next, and stores the second transmitting destination address in the right side register. In addition, the transmitting destination address generator 22E transmits to the data transmitting unit 22F the value (initial value: 0) of the left side register as the current transmitting destination address and the value (the second transmitting destination address) of the central register as the next transmitting destination address. Accordingly, the checking of the Busy signal with respect to the transmitting destination corresponding to the first transmitting destination address is performed.

Next, as shown in FIG. 10B, the transmitting destination address generator 22E shifts the value of the shift register to the left and generates the one after the next transmitting destination address (the third transmitting destination address) and stores the one after the next transmitting destination address in the right side register. In addition, the transmitting destination address generator 22E transmits to the data transmitting unit 22F the value (the first transmitting destination address) of the left side register as the current transmitting destination address and the value (the second transmitting destination address) of the central register as the next transmitting destination address. Accordingly, the transmission of the image data to the first transmitting destination is performed, and the checking of the Busy signal with respect to the second transmitting destination is performed.

Next, as shown in FIG. 10C, the transmitting destination address generator 22E shifts the value of the shift register to the left and generates the one after the next transmitting destination address and stores the one after the next transmitting destination address in the right side register. In addition, the transmitting destination address generator 22E transmits to the data transmitting unit 22F the value of the left side register as the current transmitting destination address and the value of the central register as the next transmitting destination address. After that, the transmitting destination address generator 22E repetitively performs the process.

The data transmitting unit 22F includes an internal memory (temporary storage unit) having an FIFO (First In First Out) structure or a double buffer structure to temporarily stores the image data from the data reading processor 22D.

In the case where a notice that the transmission-starting transmitting destination can receive the image data is received from the Busy manager 22G, the data transmitting unit 22F transmits the image data to the transmitting destination corresponding to the internal memory, the transmitting destination address received from the transmitting destination corresponding to the data, and the next transmitting destination address received as the next transmitting destination through the connector 21 to the distributing board 11-1. In addition, in the embodiment, if the image data, the transmitting destination address, and the next transmitting destination address are transmitted to the distributing board 11-1, these data are transmitted to the lower level distributing boards 11-2 and 11-3. In the embodiment, the data transmitting unit 22F transmits the one-clock data of the to-be-transmitted image data via the data bus and the transmitting destination address and the next transmitting destination address via the address bus in accordance with the one clock generated by the FPGA 22. In addition, in this manner, since the one-clock data and the transmitting destination address are configured to be transmitted in accordance with one clock, the transmitting destination address can be changed, for example, every one clock to be transmitted. In addition, when the image data are to be transmitted, the data transmitting unit 22F transmits a signal indicating that the to-be-transmitted image data are valid, that is, a high-state Valid signal.

The Busy manager 22G determines based on the Busy signal transmitted from the distributing board 11-1 whether or not the next transmitting destination can receive the data and notifies the result to the data transmitting unit 22F. In the embodiment, in the case where the transmitting destination can receive the data, the Busy signal is in the H (high) state; in the case where the transmitting destination cannot receive the data, the Busy signal is in the L (low) state.

Figure 11:
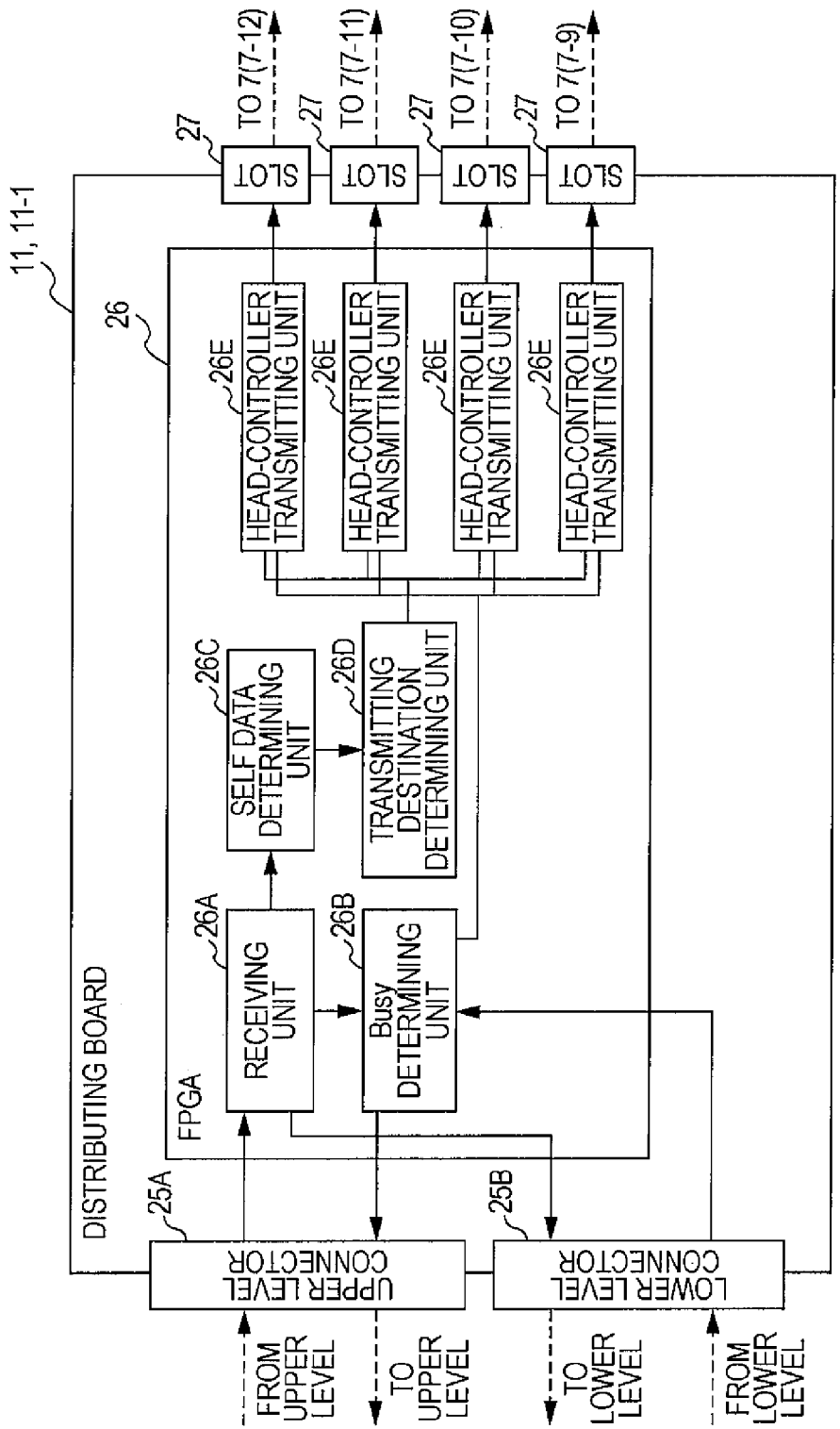
FIG. 11 is a view showing a functional configuration of a distributing board according to the first embodiment of the invention.

FIG. 11 is a view showing a functional configuration of a distributing board according to the first embodiment of the invention.

The FPGA 26 of the distributing board 11 includes: a receiving unit 26A that is an example of the next transmitting destination receiving unit and the image data receiving unit; a Busy determining unit 26B that is an example of the reception determining unit, the lower level determination-result receiving unit, and the determination-result transmitting unit; a self data determining unit 26C; a transmitting destination determining unit 26D; and a plurality of head-controller transmitting units (transmitting unit) 26E.

The receiving unit 26A receives the clock, the image data, the transmitting destination address, the next transmitting destination address, and the Valid signal that are transmitted from the upper side connector 25A. In addition, in the case where the Valid signal indicates that the data are valid (Valid signal is in the H state), the receiving unit 26A transfers the image data and the transmitting destination address to the self data determining unit 26C. In the case where the Valid signal indicates that the data are not valid (Valid signal is in the L state), the receiving unit 26A discards the image data and the transmitting destination address. In addition, the receiving unit 26A transfers the next transmitting destination address to the Busy determining unit 26B. In addition, the receiving unit 26A transmits the clock generated by the self distributing board 11 to the lower level distributing board 11, and the receiving unit 26A transmits the received image data, transmitting destination address, and next transmitting destination address in accordance with the clock. The receiving unit 26A also transmits the Valid signal. Since the distributing board 11 transmits the image data, the transmitting destination address, and the next transmitting destination address in accordance with the clock generated by the self distributing board 11, these data, in which a difference between the clock generated at the time when these data are transmitted to the distributing board 11 and the data is eliminated, can be transmitted to the lower level distributing board 11. Therefore, appropriate data can be received by the lower level distributing board 11.

The self data determining unit 26C determines whether or not the transmitting destination address received from the receiving unit 26A indicates the head controller 7 connected to the self distributing board 11. Whether or not the transmitting destination address indicates the head controller 7 connected to the self distributing board 11 can be determined according to whether or not the self identification information (distributing board ID) is stored in the transmitting destination address. The self identification information of the distributing board 11 is set, for example, by a DIP switch (not shown). In addition, in the case where it is determined that the transmitting destination address indicates the head controller 7 connected to the self distributing board 11, the self data determining unit 26C transfers the image data and transmitting destination address received from the receiving unit 26A to the transmitting destination determining unit 26D. On the other hand, in the case where it is determined that the transmitting destination address does not indicate the head controller 7 connected to the self distributing board 11, the self data determining unit 26C discards the image data and the transmitting destination address.

The transmitting destination determining unit 26D specifies the slot 27, to which the data are to be transmitted, from the transmitting destination address received from the self data determining unit 26C. In the embodiment, the slot 27 can be specified by the ID of the slot 27 in the transmitting destination address. The transmitting destination determining unit 26D transmits the image data to the head-controller transmitting unit 26E connected to the specified slot 27.

The head-controller transmitting unit 26E includes an FIFO internal memory that is used to temporarily store the image data that are to be transmitted to the head controller 7. The head-controller transmitting unit 26E stores the image data transmitted from the transmitting destination determining unit 26D in the internal memory and extracts the image data from the internal memory to transmit the image data through the slot 27 to the head controller 7. In addition, in the case where the storage amount of the image data stored in the FIFO internal memory exceeds a predetermined threshold value, the head-controller transmitting unit 26E outputs to the Busy determining unit 26B a signal (L-state Busy signal) indicating that the image data cannot be received. In the other cases, the head-controller transmitting unit 26E outputs to the Busy determining unit 26B a signal (H-state Busy signal) indicating the image data can be received. As an example of the threshold value, there is a storage amount in the case where a capacity for storing the image data corresponding to the N lines as a transmitting unit does not remain.

The Busy determining unit 26B determines whether or not the next transmitting destination address received from the receiving unit 26A indicates the head controller 7 connected to the self distributing board 11. In the case where the next transmitting destination address indicates the head controller 7 connected to the self distributing board 11, the Busy determining unit 26B specifies the head-controller transmitting unit 26E connected to the slot 27 corresponding to the next transmitting destination address and selects the Busy signal transmitted from the head-controller transmitting unit 26E to transmit the Busy signal to the upper level portion (the receiving board 10 or the distributing board 11). On the other hand, in the case where the next transmitting destination address does not indicate the head controller 7 connected to the self distributing board 11, the Busy determining unit 26B receives the Busy signal that is transmitted from the lower level portion (the distributing board 11) and transmits the Busy signal to the upper level portion (the receiving board 10 or the distributing board 11).

Next, an image data transmission process of the receiving board 10 of the printer 3 is described.

Figure 12:
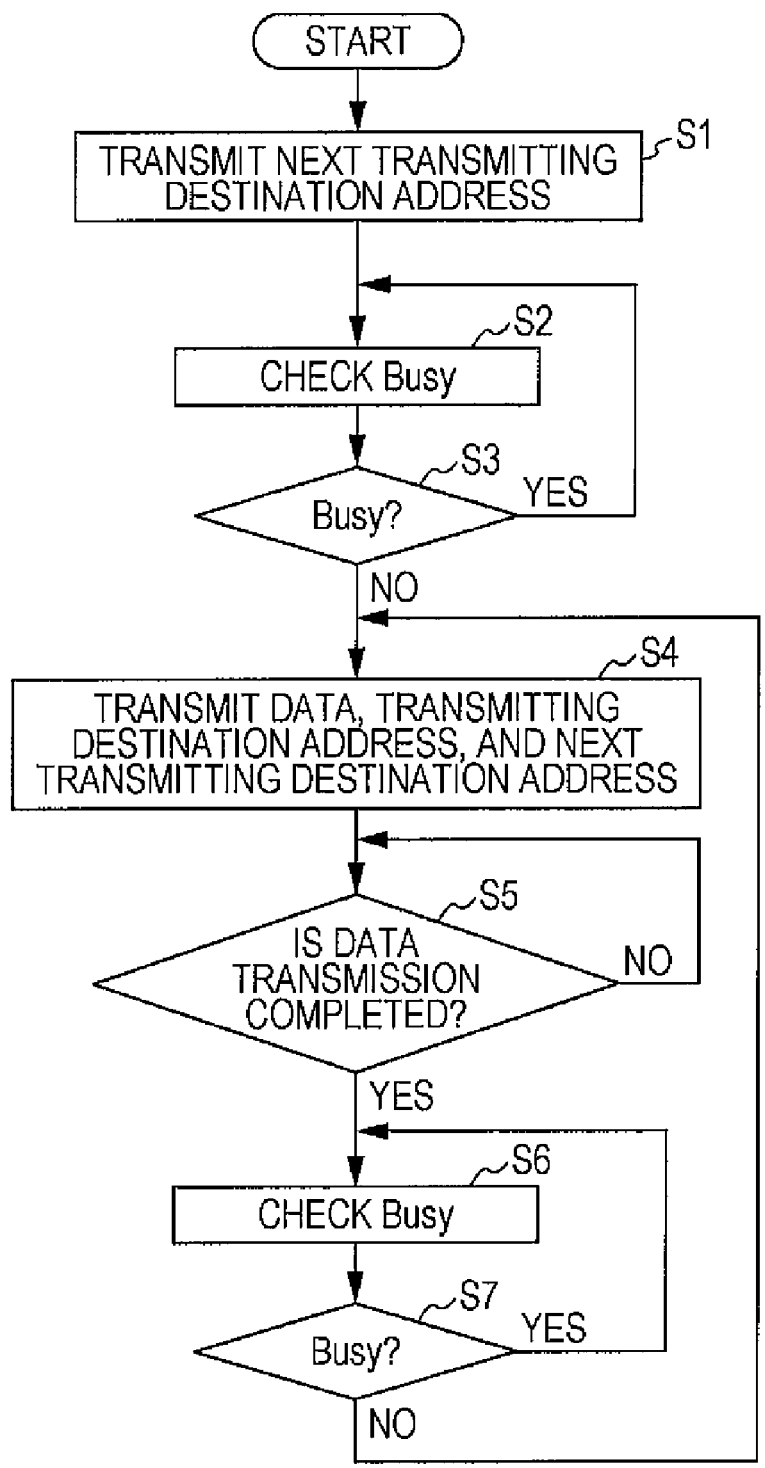
FIG. 12 is a flowchart of an image data transmission process of a receiving board according to the first embodiment of the invention.

FIG. 12 is a flowchart of an image data transmission process of the receiving board 10 according to the first embodiment of the invention.

The image data transmission process starts after the receiving unit 22A of the receiving board 10 receives the image data from the transmitting unit 5 and the data storing processor 22B stores the image data in the memory 23.

Firstly, the transmitting destination address generator 22E transfers the transmitting destination address indicating the head controller 7 of the transmitting destination that firstly transmits the image data as the next transmitting destination address to the data transmitting unit 22F. The data transmitting unit 22F transmits the next transmitting destination address through the connector 21 to the distributing board 11-1 (Step S1). Therefore, the Busy signal indicating whether or not the image data can be received from the distributing board 11 corresponding to the next transmitting destination address returns from the distributing board 11-1.

In addition, the read address generator 22C generates the address of the memory 23, from which the next to-be-transmitted image data are read, and transfers the address to the data reading processor 22D. The data reading processor 22D reads the image data, which are stored in the transferred address, from the memory 23 and transfers the image data to the data transmitting unit 22F. Therefore, the image data are stored in the data transmitting unit 22F. On the other hand, the transmitting destination address generator 22E generates the transmitting destination address, to which the image data are to be transmitted, and the next transmitting destination address, to which the next image data are to be transmitted, and outputs the transmitting destination address and the next transmitting destination address to the data transmitting unit 22F.

The Busy manager 22G checks the Busy signal received through the connector 21 (Step S2). In the case where the Busy signal indicates that the data cannot be received (Step S3: YES), the process returns to Step S2. On the other hand, in the case where the Busy signal indicates that the data can be received (Step S3: No), the message is notified to the data transmitting unit 22F.

The data transmitting unit 22F transmits the image data that are stored in the internal memory, the transmitting destination address, and the next transmitting destination address to the distributing board 11-1, and the data transmitting unit 22F transmits the H-state Valid signal (Step S4). Therefore, the Busy signal indicating whether or not the image data can be received from the distributing board 11 corresponding to the next transmitting destination address returns from the distributing board 11-1.

In addition, the read address generator 22C generates the address of the memory 23, from which the next to-be-transmitted image data are read, and transfers the address to the data reading processor 22D. The data reading processor 22D reads the image data, which are stored in the transferred address, from the memory 23 and transfers the image data to the data transmitting unit 22F. Therefore, the image data are stored in the internal memory of the data transmitting unit 22F. On the other hand, the transmitting destination address generator 22E generates the transmitting destination address, to which the image data are to be transmitted, and the next transmitting destination address, to which the next image data are to be transmitted, and outputs the transmitting destination address and the next transmitting destination address to the data transmitting unit 22F.

The data transmitting unit 22F determines whether or not the data transmission of Step S4 is completed (Step S5). In the case where the data transmission is not completed (Step S5: NO), the waiting is performed until the data transmission is completed.

On the other hand, in the case where the data transmission is completed (Step S5: YES), the Busy manager 22G checks the Busy signal received through the connector 21 (Step S6). In the case where the Busy signal indicates that the data cannot be received (that is, Busy) (Step S7: YES), the process returns to Step S6. On the other hand, in the case where the Busy signal indicates that the data can be received (Step S7: No), the message is notified to the data transmitting unit 22F. Therefore, the process after Step S4 is performed, so that the image data can be transmitted to the next transmitting destination.

Next, a detailed example of the aforementioned image data transmission process is described with reference to FIG. 13.

Figure 13:
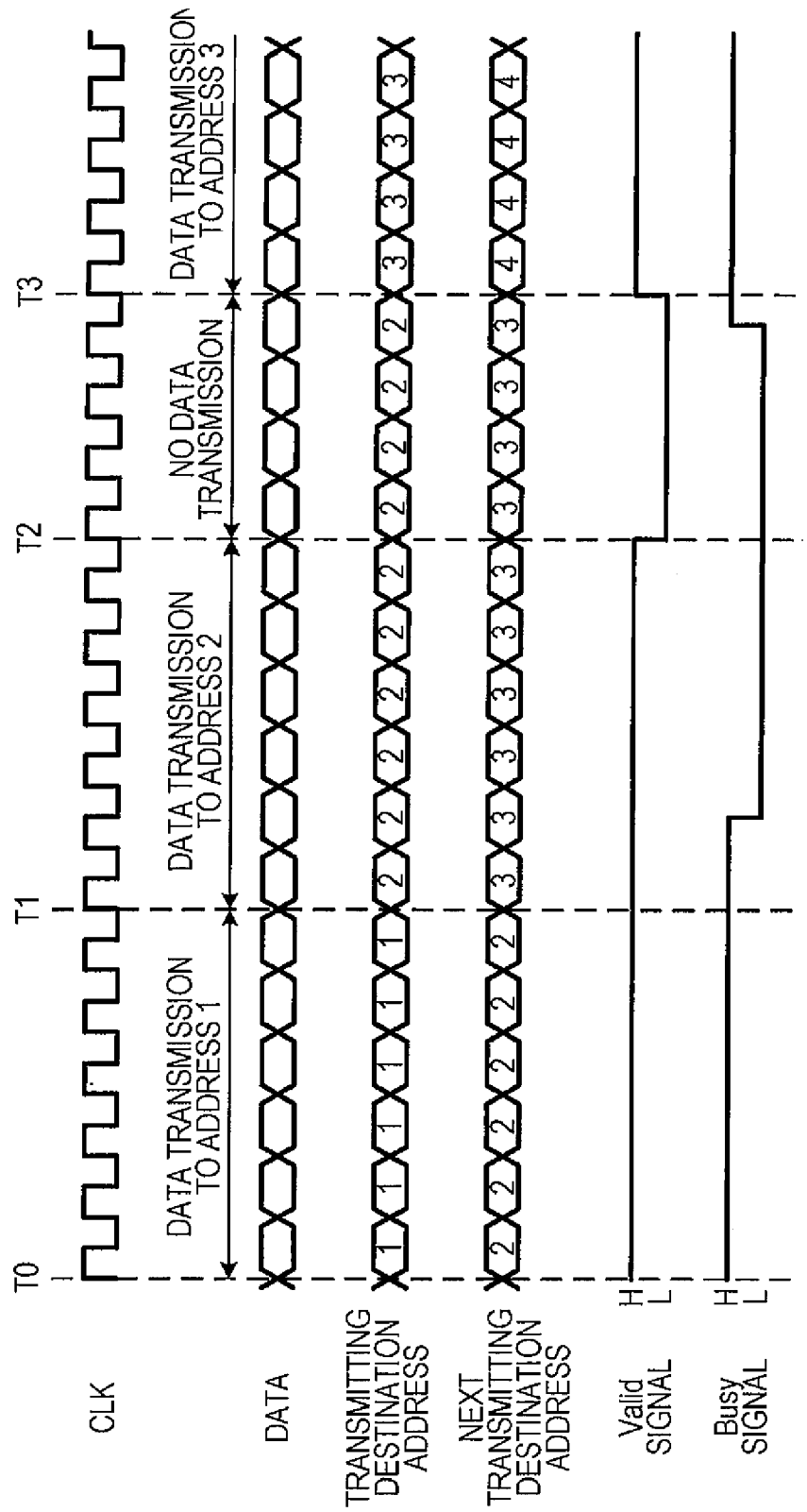
FIG. 13 is a timing diagram of various signals associated with the image data transmission according to the first embodiment of the invention.

FIG. 13 is a timing diagram of various signals associated with the image data transmission according to the first embodiment of the invention.

In the case where it is determined in Step S3 of FIG. 12 that the initial transmitting destination can receive the image data, the data transmitting unit 22F repetitively transmits the one-clock data DATA of the image data to the transmitting destination "1" (the initial transmitting destination), the transmitting destination address ("1"), and the next transmitting destination address ("2") in accordance with each clock of the clock signal CLK as shown after the time point T0 of FIG. 13. In addition, the data transmitting unit 22F transmits the Valid signal in the H state.

Until the transmission of the image data to the transmitting destination "1" is completed, the Busy signal returns from the next transmitting destination "2". Herein, when the transmission of the image data to the transmitting destination "1" is completed, since the Busy signal is in the H state at each T1, it can be shown that the next transmitting destination "2" can receive the image data.

After the transmission of the image data to the transmitting destination "1" is completed, the data transmitting unit 22F repetitively transmits the one-clock data DATA of the image data to the transmitting destination "2", the transmitting destination address ("2"), and the next transmitting destination address ("3") in accordance with each clock of the clock signal CLK as shown after the time point T1. In addition, the data transmitting unit 22F transmits the Valid signal in the H state.

Until the transmission of the image data to the transmitting destination "2" is completed, the Busy signal returns from the next transmitting destination "3". Herein, since the Busy signal is in the L state before the time point T2, it can be shown that the next transmitting destination "3" cannot receive the image data.

When the transmission of the image data to the transmitting destination "2" is completed, since the Busy signal is in the L state at each T2 and since it is shown that the next transmitting destination "3" cannot receive the image data, the data transmitting unit 22F does not perform the transmission of the image data to the transmitting destination "3". In addition, in this case, the data transmitting unit 22F transmits the transmitting destination address ("2") and the next transmitting destination address ("3") in accordance with each clock of the clock signal CLK. In addition, the data transmitting unit 22F transmits the Valid signal in the L state indicating that the data are not valid.

In addition, when the Busy signal is changed into the H state, it is shown that the next transmitting destination "3" can receive the image data. Therefore, the data transmitting unit 22F repetitively transmits the one-clock data DATA of the image data to the transmitting destination "3", the transmitting destination address ("3"), and the next transmitting destination address ("4") in accordance with each clock of the clock signal CLK as shown after the time point T3. In addition, the data transmitting unit 22F transmits the Valid signal in the H state.

Figure 14:
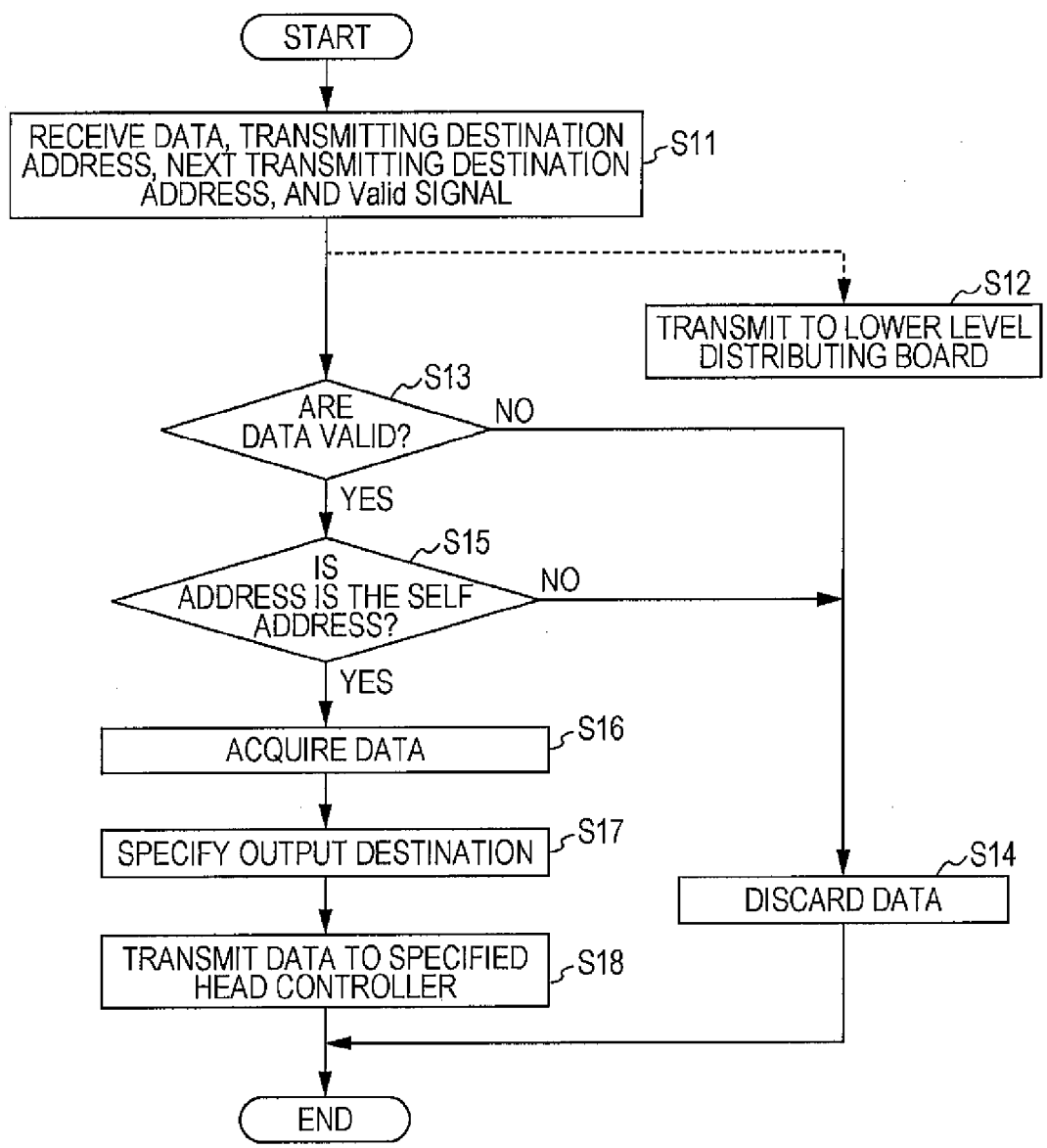
FIG. 14 is a flowchart of an image data receiving process of the distributing board according to the first embodiment of the invention.

FIG. 14 is a flowchart of an image data receiving process of the distributing board according to the first embodiment of the invention.

The receiving unit 26A of the distributing board 11 receives the data, the transmitting destination address, the next transmitting destination address, and the Valid signal from the upper level portion (the receiving board 10 or the upper level distributing board 11) (Step S11).

If there is a lower level distributing board 11, the receiving unit 26A transmits the received data, transmitting destination address, and next transmitting destination address to the lower level distributing board 11 in accordance with the self clock, and the receiving unit 26A transmits the received Valid signal (Step S12).

In addition, the receiving unit 26A determines whether or not the Valid signal indicates that the data are valid (Step S13). In the case where the Valid signal indicates that the data are not valid, the receiving unit 26A discards the data (Step S14), and the process is ended.

On the other hand, in the case where the Valid signal indicates that the data are valid (Step S13: YES), the receiving unit 26A transfers the data and the transmitting destination address to the self data determining unit 26C. The self data determining unit 26C determines whether or not the transmitting destination address indicates the head controller 7 connected to the self distributing board 11, that is, whether or not the identification information of the self distributing board 11 is included in the transmitting destination address (Step S15). In the case where the identification information of the self distributing board 11 is not included (Step S15: NO), the data are discarded (Step S14), and the process is ended.

On the other hand, the identification information of the self distributing board 11 is included (Step S15: YES), the self data determining unit 26C acquires the data and the transmitting destination address and transfers the data and the transmitting destination address to the transmitting destination determining unit 26D (Step S16). The transmitting destination determining unit 26D specifies the head-controller transmitting unit 26E corresponding to the transmitting destination address (Step S17) and transmits the image data to the specified head-controller transmitting unit 26E. The head-controller transmitting unit 26E transmits the transmitted image data through the slot 27 to the head controller 7 (Step S18). Therefore, the head controller 7 can control the head 8 connected to the head controller 7 based on the image data.

Next, an image forming system according to the second embodiment of the invention is described.

Figure 15:
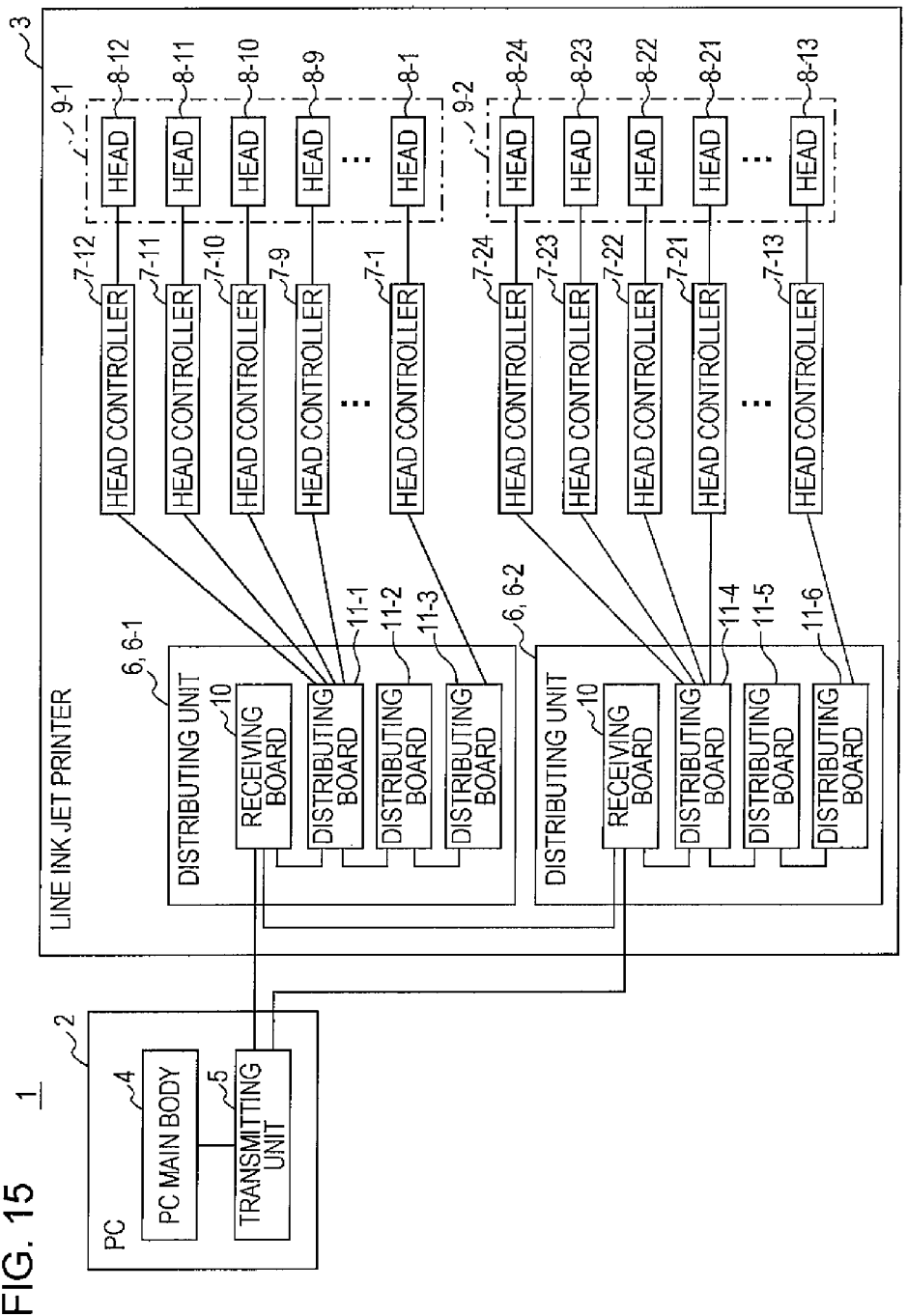
FIG. 15 is a view showing a configuration of an image forming system according to a second embodiment of the invention.

FIG. 15 is a view showing a configuration of an image forming system according to the second embodiment of the invention. In addition, the same elements as those of the image forming system according to the first embodiment are denoted by the same reference numerals.

In the printer 3 according to the second embodiment, a plurality of head columns 9-1 and 9-2 are provided to the printer 3 according to the first embodiment, and the associated head controllers 7-13 to 7-24 and the distributing unit 6-2 are further provided.

In the image forming system 1 according to the second embodiment, a ring-shaped network is formed by the transmitting unit 5, the distributing unit 6-1, and the lower level distributing unit 6-2. In other words, the transmitting unit 5 and the receiving board 10 of the distributing unit 6-1 are communicatably connected to each other; the receiving board 10 of the distributing unit 6-1 and the receiving board 10 of the lower level distributing unit 6-2 are communicatably connected to each other; and the receiving board 10 of the distributing unit 6-2 and the transmitting unit 5 are communicatably connected to each other.

Figure 16A:
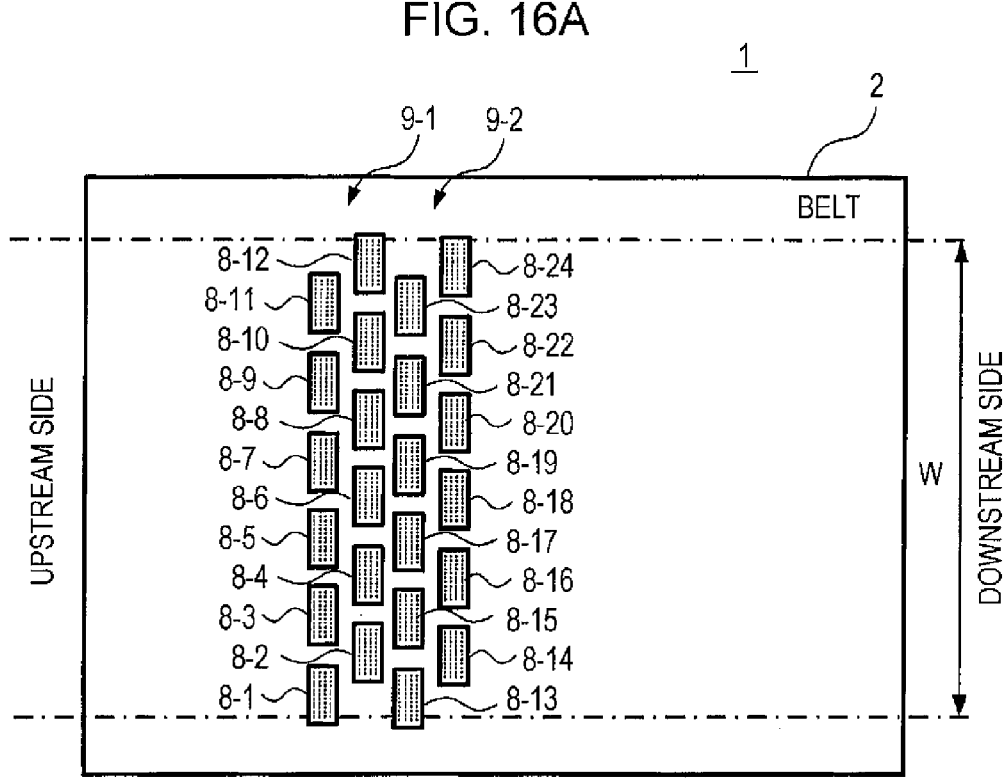
FIGS. 16A and 16B are views for explaining arrangement of heads and configuration of a head according to the second embodiment of the invention.
Figure 16B:
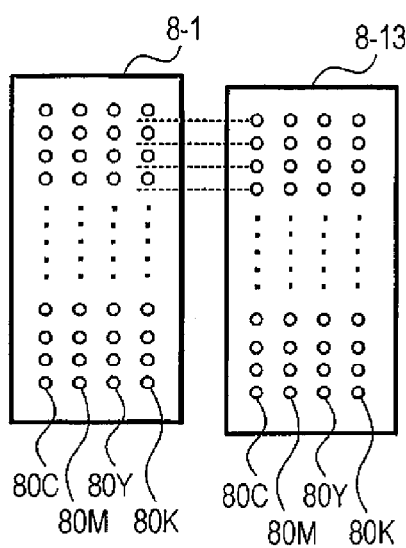

FIGS. 16A and 16B are views for explaining arrangement of heads and configuration of a head according to the second embodiment of the invention. FIG. 16A is a top plan view showing the arrangement of the heads of the printer 3; and FIG. 16B is a top plan view showing the head. In addition, in FIGS. 16A and 16B, a layout of nozzles perspectively seen from the top surfaces thereof is shown.

In the printer 3, a plurality of the head columns 9-1 and 9-2 are disposed. The configuration of each head 8 and the arrangement of the heads 8 in each of the head columns 9-1 and 9-2 are substantially the same as the configuration of each head 8 and the arrangement of the heads 8 in the head column 9 according to the first embodiment.

In the embodiment, the width direction arrangement positions of the nozzles 80C, 80M, 80Y, and 80K are different between each head 8 of the head column 9-1 and each head 8 (the head 8 located at the corresponding position in the nozzle column) corresponding to the head column 9-2.

In other words, as shown in FIG. 16B, the width direction arrangement positions of the nozzles 80C, 80M, 80Y, and 80K of the head 8-1 of the nozzle column 9-1 are shifted from the width direction arrangement positions of the nozzles 80C, 80M, 80Y, and 80K of the corresponding head 8-13 of the nozzle column 9-2 by a half of the nozzle pitch. In this manner, since the width direction arrangement positions of the nozzles between the corresponding heads of the two head columns are shifted from each other by a half of the nozzle pitch, when an image is formed by using the two head columns, the image can be formed with a resolution twice that of the image that is formed by using one head column.

Figure 17:
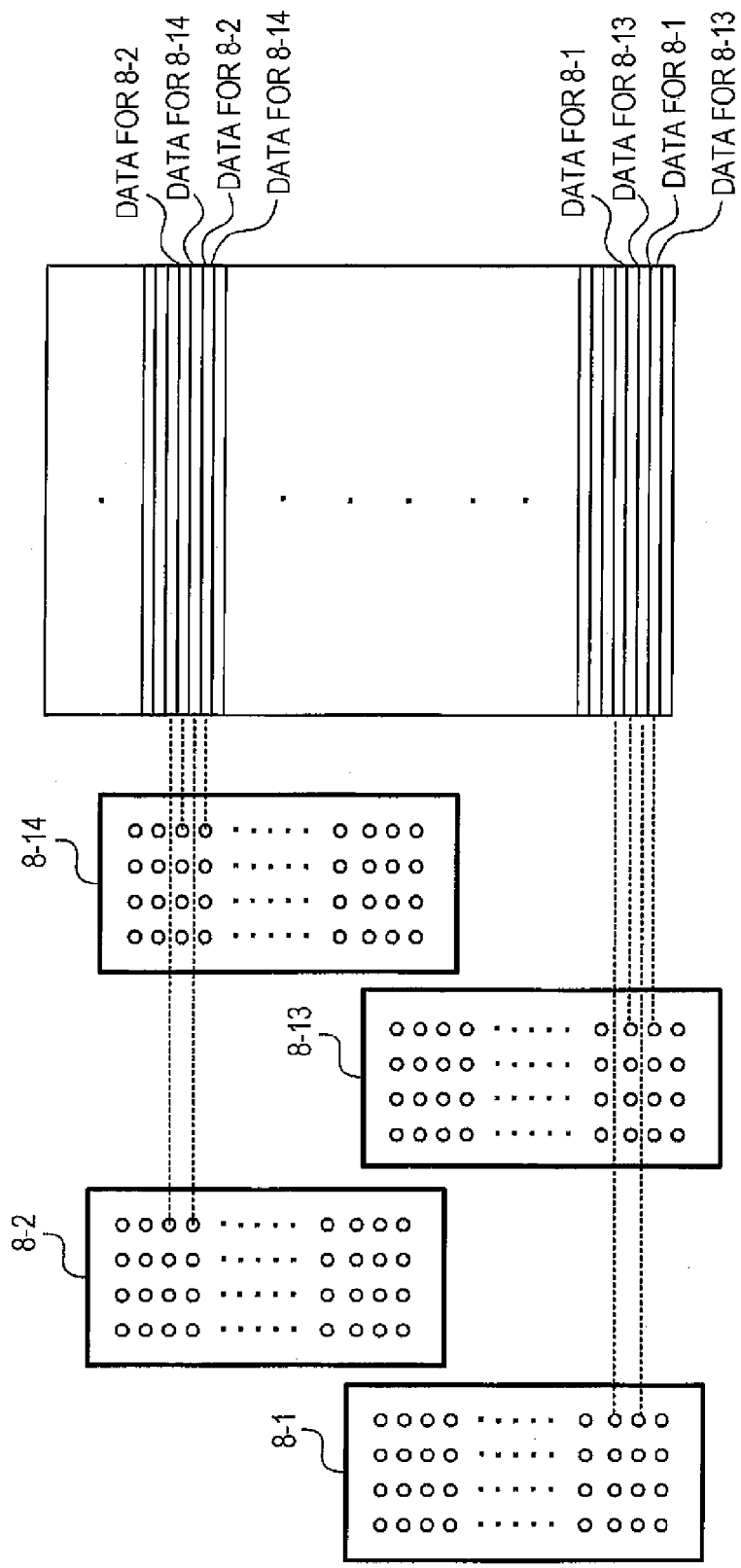
FIG. 17 is a view for explaining image data according to the second embodiment of the invention and image data used to control each head.

FIG. 17 is a view for explaining image data according to the second embodiment of the invention and image data that are transmitted to a head.

In the embodiment, since the image is formed with the width direction resolution that is twice the resolution of the first embodiment by using a plurality of the head columns 9-1 and 9-2, in the case where the image with the same size is printed, the width direction resolution in the image data needs to be twice. In addition, since the head columns in which the nozzles for forming the pixels adjacent to each other in the width direction are included are different, the data of the lines in the image data are alternately aligned as the data used by the head columns.

For example, as shown in FIG. 17, in the image data, the data for the head 8-1 of the head column 9-1 and the data for the head 8-13 of the head column 9-2 are alternately aligned. In addition, similarly, the data for the head 8-2 of the head column 9-1 and the data for the head 8-14 of the head column 9-2 are alternately aligned.

Figure 18:
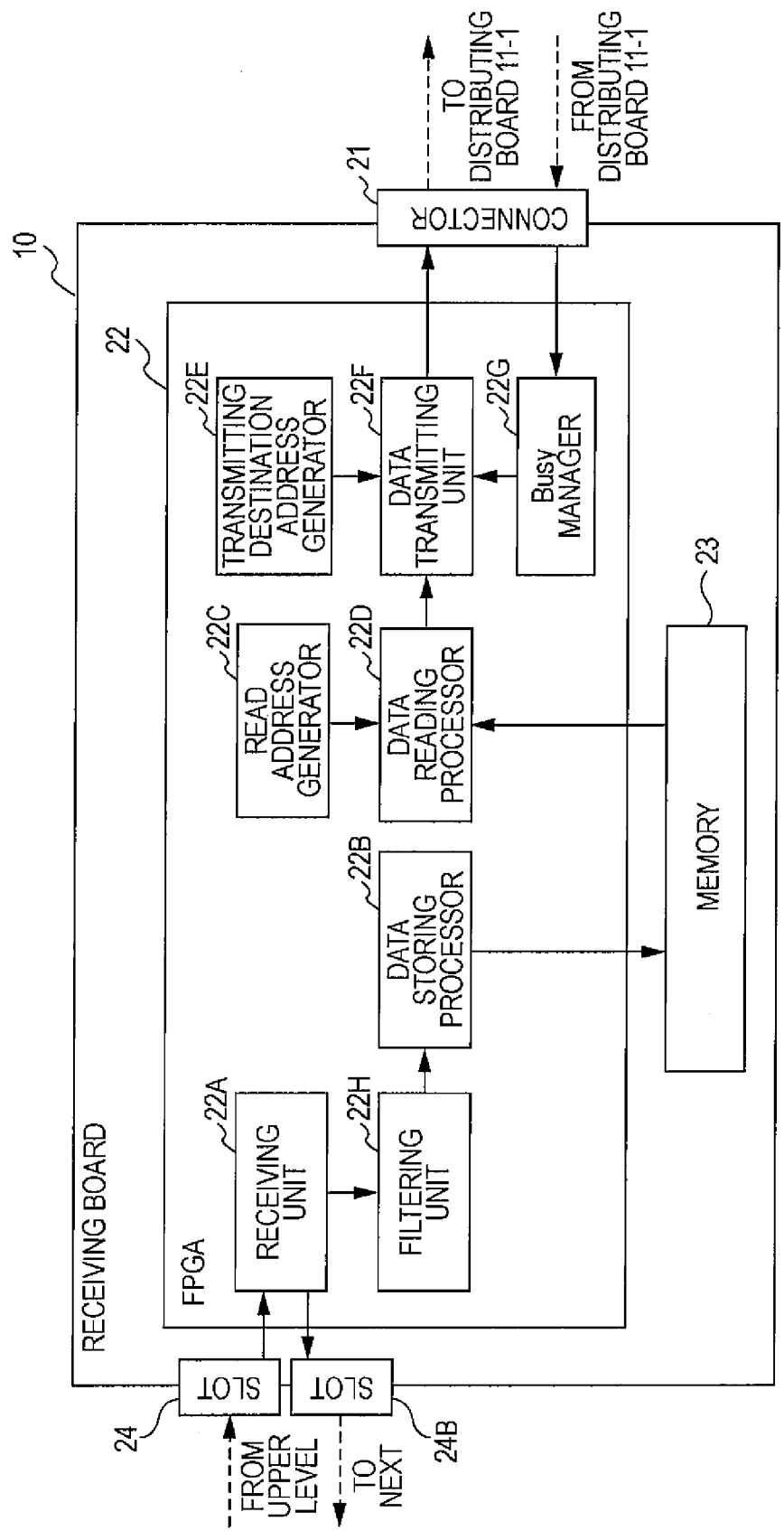
FIG. 18 is a view showing a functional configuration of a receiving board according to the second embodiment of the invention.

FIG. 18 is a view showing a functional configuration of a receiving board according to the second embodiment of the invention.

The receiving board 10 according to the second embodiment is configured by further providing the slot 24B and the filtering unit 22H to the receiving board 10 according to the first embodiment and adding new functions to the receiving unit 22A.

The slot 24B can be connected to the next portion (other receiving board 10 or transmitting unit 5) through a communication line.

The receiving unit 22A receives image data or the like that are transmitted from the slot 24 of the upper side. In addition, the receiving unit 22A transmits the received image data or the like to the next portion (lower level receiving board 10 or transmitting unit 5) through the slot 24B.

The filtering unit 22H acquires from the image data that are received by the receiving unit 22A only the data required by the head controller 7 that is connected to the distributing board 11 connected thereto and transfers the data to the data storing processor 22B. In the embodiment, in the filtering unit 22H, the to-be-acquired lines of the image data are set in advance, and only the image data of the necessary lines are acquired from the image data based on the setting.

For example, in the case where the image data shown in FIG. 17 are received from the receiving unit 22A, the filtering unit 22H of the receiving board 6-1 acquires the image data of only the lines that are the data for the heads 8-1 to 8-12 of the head column 9-1 among the image data. On the other hand, the filtering unit 22H of the receiving board 6-2 acquires the image data of only the lines that are the data for the heads 8-13 to 8-24 of the head column 9-2 among the image data.

FIG. 19 is a view for explaining distributing unit setting information according to the second embodiment of the invention.

In the embodiment, the distributing unit 6 can set a portion of the information required by the distributing units 6-1 and 6-2 to the register (not shown) in the inner portion thereof based on the distributing unit setting information that is transmitted from the transmitting unit 5. The distributing unit setting information is the information that is configured by including the number of colors of the image data, the transport direction image size, the width direction image size, the colors (to-be-acquired colors) of the image data that are to be acquired by the distributing unit 6, the lines (to-be-acquired lines) of the image data that are to be acquired by the distributing unit 6, and the connection state of the head controller in correspondence to the distributing unit ID that specifies the to-be-set distributing unit 6.

Herein, the head controller connection state information is the information indicating the connection state (existence or non-existence of connection) of the head controller 7 to the slot 27 of the distributing board 11 of the corresponding the distributing unit 6. For example, 1 bit is allocated as the data indicating the connection state to each slot 27. In the case where the head controller 7 is connected to the corresponding slot 27, the bit is set to "1". In the case where the head controller 7 is not connected thereto, the bit is set to "0". Even in the case where the head controller 7 is not connected to a portion of the slots 27, the slot 27 connected to the head controller 7, to which the transmitting destination address generator 22E are to transmit the image data, can be specified by referring to the connection state of the head controller, so that the corresponding transmitting destination address can be generated.

Next, a printer according to the third embodiment of the invention is described.

In the printer according to the third embodiment of the invention, the configuration and arrangement of the heads used therein and the functions of the filtering unit 22H of the receiving board 10 are different from those of the printer according to the second embodiment shown in FIG. 15. But the other configurations are the same.

Figure 20A:
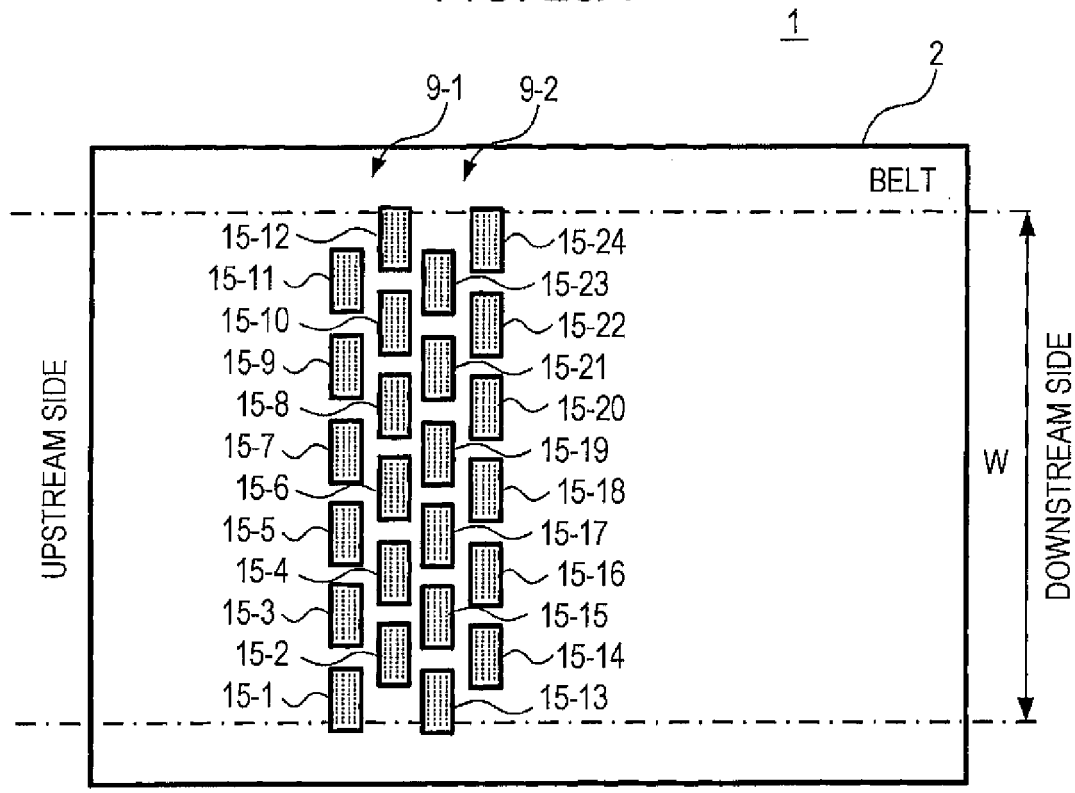
FIGS. 20A and 20B are views for explaining arrangement of heads and configuration of a head according to the third embodiment of the invention.
Figure 20B:
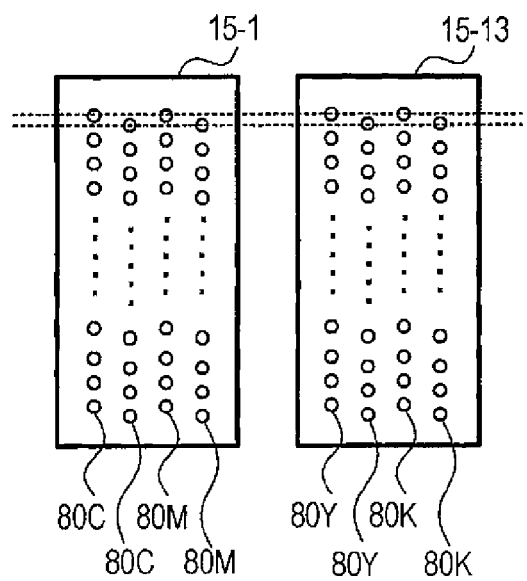

FIGS. 20A and 20B are views for explaining arrangement of heads and configuration of a head according to the third embodiment of the invention. FIG. 20A is a top plan view showing the arrangement of the heads of the printer 3; and FIG. 20B is a top plan view showing the head. In addition, in FIGS. 20A and 20B, a layout of nozzles perspectively seen from the top surfaces thereof is shown.

In the printer 3 according to the embodiment, a plurality of head columns 9-1 and 9-2 are disposed. The head column 9-1 is allocated to perform printing cyan and magenta, and the head column 9-2 is allocated to perform printing yellow and black.

Each of the heads 15 (15-1 to 15-24) according to the embodiment has four nozzle columns in which the nozzles 80C, 80M, 80Y, and 80K are aligned as shown in FIG. 20B. Two nozzle columns at the upstream side and two nozzle columns at the downstream side are nozzle columns that eject different color ink. In other words, in the heads 15-1 to 15-12, the two nozzle columns at the upstream side are the nozzle columns that eject cyan, and the two nozzle columns at the downstream side are the nozzle columns that eject magenta. In addition, in the head 15-13 to 15-24, the two nozzle columns at the upstream side are the nozzle columns that eject yellow, and the two nozzle columns at the downstream side are the nozzle columns that eject black. The positions of the two nozzle columns in the width direction Y, which eject each color, are shifted from each other by a half of the nozzle pitch.

In the embodiment, the width direction arrangement positions of the nozzles 80c and 80M of the heads 15-1 to 15-12 in the head column 9-1 are the same as the width direction arrangement positions of the nozzles 80Y and 80K of the heads 15-13 to 15-24 in the head column 9-2.

In the embodiment, the hardware configuration of the receiving board 10 is the same as that of the receiving board 10 according to the second embodiment. But the setting information of the receiving board 10 is different from that of the second embodiment, and the filtering unit 22H has a different function.

In the filtering unit 22H, the to-be-acquired colors in the image data are set. The filtering unit 22H acquires only the image data of the required colors from the image data based on the setting. For example, the filtering unit 22H of the receiving board 10 of the distributing unit 6-1 is set to acquire the image data of cyan and magenta, and the filtering unit 22H of the receiving board 10 of the distributing unit 6-2 is set to acquire the image data of yellow and black. In addition, the setting of the filtering unit 22H may be performed based on the to-be-acquired color in the distributing unit setting information shown in FIG. 18.

Hereinbefore, the invention is described with reference to the embodiments. However, the invention is not limited to the aforementioned embodiments, but it can be adapted to various aspects.

For example, in the aforementioned embodiments, in order to print the entirety of the maximum printable width, the head column includes a plurality of the heads, each of which can perform the printing in a portion of the maximum printable width, and these heads are arranged so that the printing is performed over the entirety of the maximum printable width. However, the invention is not limited thereto. One head that can perform the printing over the entirety of the maximum printable width, that is, one head having a plurality of nozzles capable of performing the printing over the entirety of the maximum printable width may be provided. In addition, in the aforementioned embodiments, a plurality of the nozzles are aligned in the width direction. However, the invention is not limited thereto. A plurality of the nozzles may be aligned in the direction different from the width direction and intersecting the transport direction. The point is to arrange the nozzles over the entire width direction.

In addition, in the aforementioned embodiments, the head controller that controls a plurality of the nozzles (nozzle group) of the entire head as a minimum unit is provided. However, the invention is not limited thereto. For example, a controller that controls a nozzle group of a portion of the head as a unit may be provided, and the distributing board may transmit the corresponding image data to the one or more controllers.

In addition, in the aforementioned embodiments, a combination of the image data, the transmitting destination address, and the next transmitting destination address is transmitted through individual signal lines in accordance with one clock. However, the invention is not limited thereto. Data as a combination of the image data, the transmitting destination address, and the next transmitting destination address may be transmitted through the same signal line.

In addition, in the aforementioned embodiments, the receiving board 10 and a plurality of the distributing boards 11-1 to 11-3 are connected in cascade. However, the invention is not limited thereto. For example, the receiving board 10 and a plurality of the distributing boards 11-1 to 11-3 may be connected in a bus type network. The point is to directly or indirectly transmit the data from the receiving board 10 to the distributing board.

In addition, in the aforementioned embodiments, the transmitting destination address and the next transmitting destination address are configured to be transmitted at the same time. However, the invention is not limited thereto. The next transmitting destination address may be transmitted at least before the transmission of the image data to the transmitting destination is completed. Therefore, in comparison with the case where the inquiry into the state of the next transmitting destination starts after the transmission of the image data to the transmitting destination is completed, the result of determination can rapidly return, so that the transmission of the image data to the next transmitting destination can rapidly start. Accordingly, the communication efficiency can be improved.

In addition, in the aforementioned embodiments, two head columns are provided in the transport direction. However, the invention is not limited thereto. Three or more head columns may be provided in the transport direction.

In addition, in the aforementioned embodiments, the line ink jet printer is described as an example of the image forming apparatus. However, the invention is not limited thereto. It may be adapted to an image forming apparatus that ejects liquid other than ink or an image forming apparatus that sprays a power such as a toner.

The entire disclosure of Japanese Patent Application No. 2008-322196, filed Dec. 18, 2008 is expressly incorporated by reference herein.

What is claimed is:

1. An image forming apparatus comprising:
   a plurality of controllers that controls nozzle groups for forming an image on an image forming medium based on image data;
   a plurality of distribution processing units that are connected to a portion of the controllers to transmit to the controllers image data for controlling the nozzle groups allocated to the controllers; and
   a transmitting processing unit that is used to transmit the image data to a plurality of the distribution processing units,
   wherein upper level distribution processing units and lower level distribution processing units from the first distribution processing unit at the uppermost level to the second distribution processing unit at the lowermost level are communicatably connected to each other, and the first distribution processing unit is communicatably connected to the transmitting processing unit,
   wherein the transmitting processing unit includes:
   a memory that stores the image data;
   a next transmitting destination determining unit that determines the next transmitting destination identification information indicating the controller as the next transmitting destination with respect to the controller as the transmitting destination;
   an image data reading unit that reads from the memory the image data that are to be transmitted to the controller of the transmitting destination;
   an image data transmitting unit that transmits to the controller of the transmitting destination the read image data;
   a next transmitting destination identification information transmitting unit that transmits the next transmitting destination identification information to the first distribution processing unit before the transmission of the image data to the controller of the transmitting destination is completed; and
   a determination-result receiving unit that receives from the first distribution processing unit a result of determination as to whether or not the controller indicated by the next transmitting destination identification information receives the image data,
   wherein in the case where the image data can be received as the result of determination and in the case where the transmission of the image data to the controller of the next transmitting destination is prepared, the image data transmitting unit transmits the image data to the controller indicated by the next transmitting destination identification information as a new transmitting destination, and
   wherein the distribution processing unit includes:
   a next transmitting destination receiving unit that receives the next transmitting destination identification information from the transmitting processing unit or the upper level distribution processing unit;
   a reception determining unit that determines whether or not the controller can receive the image data in the case where the controller indicated by the received next transmitting destination identification information is the controller allocated to the corresponding distribution processing unit;

a lower level determination-result receiving unit that receives the result of determination from the lower level distribution processing unit;

a determination-result transmitting unit that transmits to the transmitting processing unit or the upper level distribution processing unit the result of determination that the image data can be received in the case where the image data can be received as the result of self determination or the result of determination from the lower level distribution processing unit, and that transmits to the transmitting processing unit or the upper level distribution processing unit the result of determination that the image data cannot be received in the other cases;

an image data receiving unit that receives the image data for the transmitting destination from the transmitting processing unit or the upper level distribution processing unit; and a transmitting unit that transmits the image data to the corresponding controller in the case where the image data are the image data for the controller allocated to the corresponding distribution processing unit.

2. The image forming apparatus according to claim 1, wherein the next transmitting destination identification information transmitting unit and the image data transmitting unit transmits to the first distribution processing unit a combination of the image data, the transmitting destination identification information of the controller as the transmitting destination, and the next transmitting destination identification information.

3. The image forming apparatus according to claim 1, wherein the image data transmitting unit transmits to the transmitting destination the image data in a unit of data including predetermined lines of the data for forming one line of the image by using one nozzle among the image data.

4. The image forming apparatus according to claim 3, wherein the data including predetermined lines are a data amount that requires a transmission time that is longer than an expected arrival time in which the result of determination from the second distribution processing unit is expected to arrive.

5. The image forming apparatus according to claim 1, wherein the image data reading unit reads from the memory the image data in a minimum unit of the data for forming one line of the image by using one nozzle among the image data.

6. The image forming apparatus according to claim 1,
wherein the data transmitting unit includes a temporary storage unit that temporarily stores the image data to the transmitting destination,
wherein the image data reading unit reads the image data from the memory and stores the image data in the temporary storage unit in the case where the image data cannot be received as the result of determination, and
wherein the data transmitting unit extracts the image data from the temporary storage unit and transmits the image data in the case where the image data can be received as the result of determination.

* * * * *